United States Patent
Morimoto et al.

(10) Patent No.: US 8,656,815 B2
(45) Date of Patent: *Feb. 25, 2014

(54) TRANSFER OPTICAL SURFACE MACHINING METHOD, OPTICAL DEVICE PRODUCING MOLD AND OPTICAL DEVICE

(75) Inventors: Tomoyuki Morimoto, Hachioji (JP); Shigeru Hosoe, Hachioji (JP); Hiroyuki Matsuda, Sagamihara (JP); Toshiyuki Imai, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 2581 days.

This patent is subject to a terminal disclaimer.

(21) Appl. No.: 11/290,499

(22) Filed: Dec. 1, 2005

(65) Prior Publication Data

US 2006/0120816 A1 Jun. 8, 2006

(30) Foreign Application Priority Data

Dec. 6, 2004 (JP) ................... 2004-352368

(51) Int. Cl.
*B23B 1/00* (2006.01)
*G02B 3/08* (2006.01)

(52) U.S. Cl.
USPC ............................................. 82/1.11; 82/118

(58) Field of Classification Search
USPC ......... 82/1.11, 117, 118; 249/187.1; 359/642; 451/11; 409/163; 407/119; 428/596, 428/406
See application file for complete search history.

(56) References Cited

U.S. PATENT DOCUMENTS

| | | | | |
|---|---|---|---|---|
| 7,089,836 B2 * | 8/2006 | Kato et al. | ...................... | 82/1.11 |
| 7,390,242 B2 * | 6/2008 | Kim et al. | ...................... | 451/285 |
| 7,686,988 B2 * | 3/2010 | Hosoe | ............... | 264/2.5 |
| 7,762,165 B2 * | 7/2010 | Kimura | .......................... | 82/1.11 |
| 7,861,624 B2 * | 1/2011 | Kunimatsu et al. | ............ | 82/1.11 |
| 2005/0008889 A1 * | 1/2005 | Hayashi et al. | ................ | 428/596 |
| 2007/0049175 A1 * | 3/2007 | Kim et al. | ........................ | 451/11 |
| 2008/0273253 A1 * | 11/2008 | Kimura | ......................... | 359/742 |

* cited by examiner

*Primary Examiner* — Will Fridie, Jr.
(74) *Attorney, Agent, or Firm* — Finnegan, Henderson, Farabow, Garrett & Dunner, LLP

(57) ABSTRACT

A machining method of machining a transfer optical surface on a optical element producing die having the transfer optical surface made of a material having Vickers hardness of Hv1500 or more, comprising: machining the transfer optical surface on the optical element producing die by cutting with a cutting tool, wherein a rake face of a tip of a blade of the cutting tool is set with an angle of minus values at an incising point on a surface to be machined.

37 Claims, 19 Drawing Sheets

(THE SMALLER THE NUMERICAL VALUE, THE MORE RESISTANT TO WEAR)

TRANSMITTED WAVE FRONT OF OPTICAL DEVICE (GRINDING)　　　　　　(CUTTING)

※ WAVELENGTH USED BY INTERFEROMETER: 405 m λ

TRANSMITTED WAVE FRONT OF OPTICAL DEVICE
FIG. 20 (b)
(GRINDING + POLISHING)
FIG. 20 (a)
(CUTTING + POLISHING)
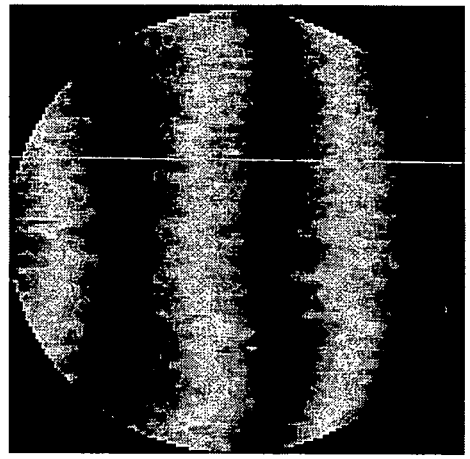
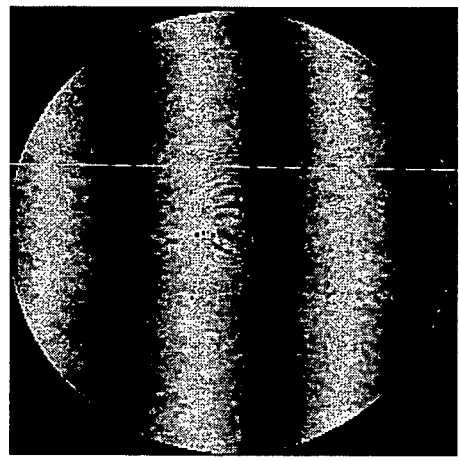
※ WAVELENGTH USED BY INTERFEROMETER: 405 mλ
FIG. 21
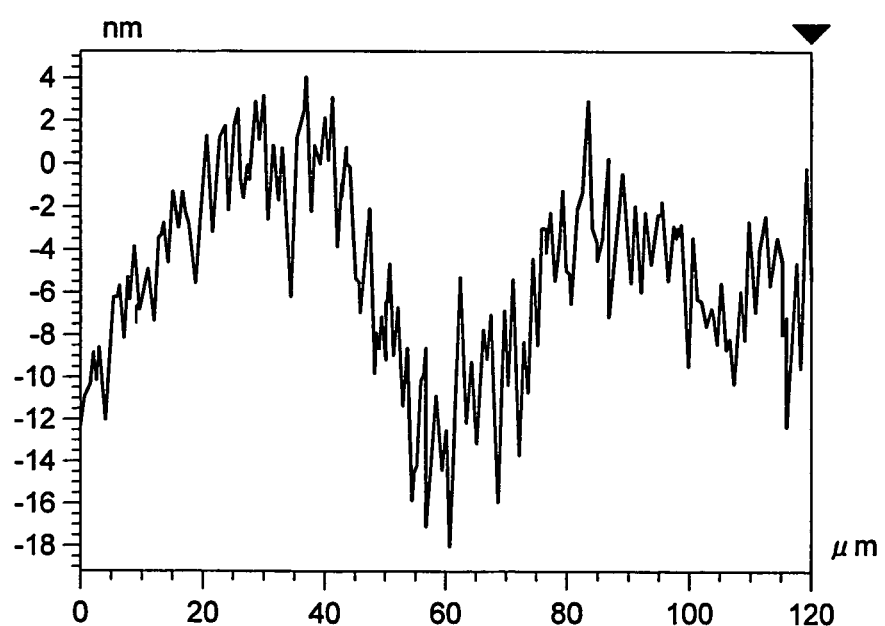

CUT SURFACE EXHIBITING THE RESULT
OF BRITTLE MODE CUTTING

REASON FOR THE SURFACE EXHIBITING THE RESULT OF
BRITTLE MODE CUTTING: INADEQUATE MACHINING
CONDITIONS AND TOOL CHIPPING (INCLUDING WEAR)

DIAMOND TOOL SUBSEQUENT TO CUTTING
(CONVENTIONAL CUTTING METHOD)

( x 1000)

CUT SURFACE EXHIBITING THE RESULT
OF DUCTILE MODE CUTTING (MACHINING ACCORDING TO THE PRESENT INVENTION)

( x 1000)

TRANSFER OPTICAL SURFACE MACHINING METHOD, OPTICAL DEVICE PRODUCING MOLD AND OPTICAL DEVICE

This application is based on Japanese Patent Application No. 2004-352368 filed on Dec. 6, 2004, in Japanese Patent Office, the entire content of which is hereby incorporated by reference.

BACKGROUND OF THE INVENTION

The present invention relates to a transfer optical surface machining method, an optical device producing mold and an optical device. More specifically, this invention relates to a method of machining the transfer optical surface of an optical device producing mold characterized by a high degree of hardness, suitable for a glass mold, to the optical device producing mold manufactured by using the same, and to the optical device produced using the same.

In the prior art, the most popular method of producing an optical device is injection molding of plastic materials. Injection molding has been producing an optical device of higher precision with high efficiency at a lower cost. However, the development of the digital imaging technology has enabled easy handling of high-volume image information, and a rapid advance has taken place in achieving higher definition and miniaturization of an image capturing camera as one of the input devices. There has been an increase in the number of pixels of the image capturing device, and further miniaturization of the device. Thus, the image capturing lens for forming an optical image thereon is required to provide remarkable performances, and the optical device is required to ensure higher precision.

In the optical disk used to input and store the image as well as the information on music and text data, there has been an active demand for higher density, i.e. higher volume and further miniaturization. The wavelength of the laser light source used in the read/write operations on the optical disk is changing from the conventional red to blue and purple of shorter wavelength. To meet this trend, the pickup optical device is required to ensure higher precision and higher NA (numerical aperture) from the conventional NA of 0.65 to a new 0.85 or more. It is further required to provide higher performances and higher functions capable of ensuring compatibility with the conventional optical disk system. Techniques meeting these requirements have been developed, and are being put into practical use.

As described above, there has been a rapid demand for an optical device of the precision and function far advanced over the conventional level. In this context, it is not sufficient that the initial performance of the optical device is high. Because of the improved performances, the optical device is subjected to a drastic change in performances when exposed to changes in the temperature and wavelength. To avoid such a problem, it is very important that the optical device is capable of stable maintenance of initial performances such as environmental resistance and explosion resistance.

The optical glass, produced by hot press molding, called a glass mold (hereinafter referred to as "GM") is more preferably used such an optical device than plastic material, because the GM is hardly subjected to a change in refraction index, and offers a wider range in the selection of materials, thereby expanding the scope of freedom in designing.

However, the softening temperature of the optical glass is 400 through 600° C. This is a few hundred degrees higher than the softening temperature of the plastic. At this temperature, the mirror surface cannot be maintained in the atmosphere due to oxidation, even in the case of a heat-resistant metallic material. Accordingly, the GM producing mold requires use of such a material as ceramic or cemented carbide characterized by high heat resistance and a high degree of hardness (having a Vickers hardness of Hv 1500 or more) so that the transfer optical surface is hardly damaged. Incidentally, in the production of these optical devices, it goes without saying that the contour precision and surface roughness of the mold serving as a transfer master are major factors in determining the quality of the molded optical device. In the present specification, the term "transfer optical surface" refers to the portion (surface) of the mold for molding and transferring the optical surface of the optical device to be produced.

The high-hardness material of such a GM producing mold is very difficult to process in order to get the transfer optical surface. A diamond is commonly used as a tool for machining such a material. In the conventional method, a wheel using diamond abrasive grains has been employed to perform generative machining of the transfer optical surface by grinding. Polishing has been done after grinding, in some cases.

After machining a high-hardness material, a new cutting blade (diamond abrasive grain) present under the surface of a diamond wheel appears (self-regenerating function of the blade). This mechanism prevents the machining capacity being deteriorated during machining. However, such a wheel is produced by mixing the abrasive grain with the binder, and burning and setting thereafter. Accordingly, a uniform structure cannot be obtained when viewed from a microscopic scale. It is difficult to manufacture a wheel contour with high precision. Accordingly, the machined contour is easily subjected to an error due to the wheel contour error. Further, the binder does not have much hardness, and is subjected to elastic deformation due to the force applied to the wheel during the machining. Thus, on a microscopic scale, grinding does not provide a method of transferring the precision of movement by forced infeed; it rather provides pressure transfer. Machining precision can hardly be improved if the machine movement precision and tool rotary precision have been improved.

Further, when dressing the wheel, a process of cutting the wheel called "truing" is applied. As described above, the wheel is made of a mixture between the very hard diamond abrasive grain and soft binder. Accordingly, uniform cutting is not performed, but very rough machining is performed, wherein the diamond abrasive grains are picked up while the binder is scraped. The wheel contour is dressed in this manner. Thus, the contour precision of the produced wheel is not very satisfactory. Not only that, the binder may be cracked by scraping. Force may have been applied to the diamond abrasive grains to disengage them, and the diamond abrasive grains may be kept unstable. In some cases, the diamond abrasive grains are disengaged so that holes are formed. The surrounding binder is damaged by excessive movement at the time of scraping the binder. Such a phenomenon occurs to the surface of the wheel, which is kept very unstable. Accordingly, in the conventional method, preliminary grinding operation was performed after truing, whereby the unstable portion of the wheel surface is removed, and grinding ratio is stabilized. However, the degree of preliminary grinding for stabilizing the wheel surface has been determined intuitively. The conventional concept of dressing such a tool of rough structure by the aforementioned rough method has been unfitted for high-precision, high-accuracy machining of the transfer optical surface.

Further, grinding is based on the self-regenerating function of the cutting blade resulting from wear of the wheel. The contour of the wheel is constantly subjected to changes during machining. A contour error occurs on the transfer optical surface having been produced. Especially in the concave and small transfer optical surface or the deep transfer optical surface (having a depth), the wheel size must be reduced in order to ensure that the wheel reaches the surface to be machined, without interfering with the outer periphery. Machining of a high-precision transfer optical surface is difficult due to rapid wear of the wheel.

The present applicant found out that cutting by a diamond tool is effective in the generation of a transfer optical surface using a high-hardness material, and has already proposed a method based on this principle. The Patent Document 1 according to the application filed by the present applicant discloses that high-precision machining contour and mirror surface can be provided by cutting; using an optical device producing mold.

[Patent Document 1] Official Gazette of Japanese Patent Tokkai 2004-223700

The technique disclosed in the Patent Document 1 is far superior to the conventional grinding with respect to machined contour precision and surface roughness. Superiority is increased with a decrease in the transfer optical surface diameter. However, chipping of the diamond tool tends to occur, when cutting a material of high hardness using a diamond tool. If the tool is chipped, a uniform and continuous surface cannot be obtained after cutting. The surface roughness will deteriorate and the amount of infeed will be changed. The required contour precision of the transfer optical surface cannot be maintained. Such a problem of chipping may occur to other tools than a diamond tool.

SUMMARY OF THE INVENTION

The object of the present invention is to solve the aforementioned problems and to provide a transfer optical surface machining method, wherein, when machining the material of high hardness used in an optical device producing mold, the chipping of a tool can be minimized to prolong the service life of the tool, and the transfer optical surfaces of multiple optical device producing molds can be cut to high precision, using one tool. The aforementioned object of the present invention also includes providing an optical device producing mold machined by the aforementioned method, and an optical device formed thereby.

The method of machining the transfer optical surface described in Item 1 is further characterized in that, in the transfer optical surface machining method for the optical device producing mold containing a transfer optical surface made up of the material having a Vickers hardness of Hv 1500 or more, the angle of the rake face on the tip of the tool has a negative value (minus value) in the infeed point (incising point), when producing a transfer optical surface by cutting.

BRIEF DESCRIPTION OF THE DRAWINGS

FIG. 20(a) is a diagram representing the result of measuring a glass optical device produced by using an optical device producing mold made of the material of high hardness finished to a high precision by polishing subsequent to cutting in the present invention, wherein an interferometer is used for observation;

FIG. 20(b) is a diagram representing the result of measuring a glass optical device produced by using an optical device producing mold made of the material of high hardness finished to a high precision by polishing subsequent to machining according to the conventional grinding method, wherein an interferometer is used for observation;

FIG. 21 is a diagram representing the roughness of the cut surface;

DETAILED DESCRIPTION OF THE PREFERRED EMBODIMENT

Figure 1:
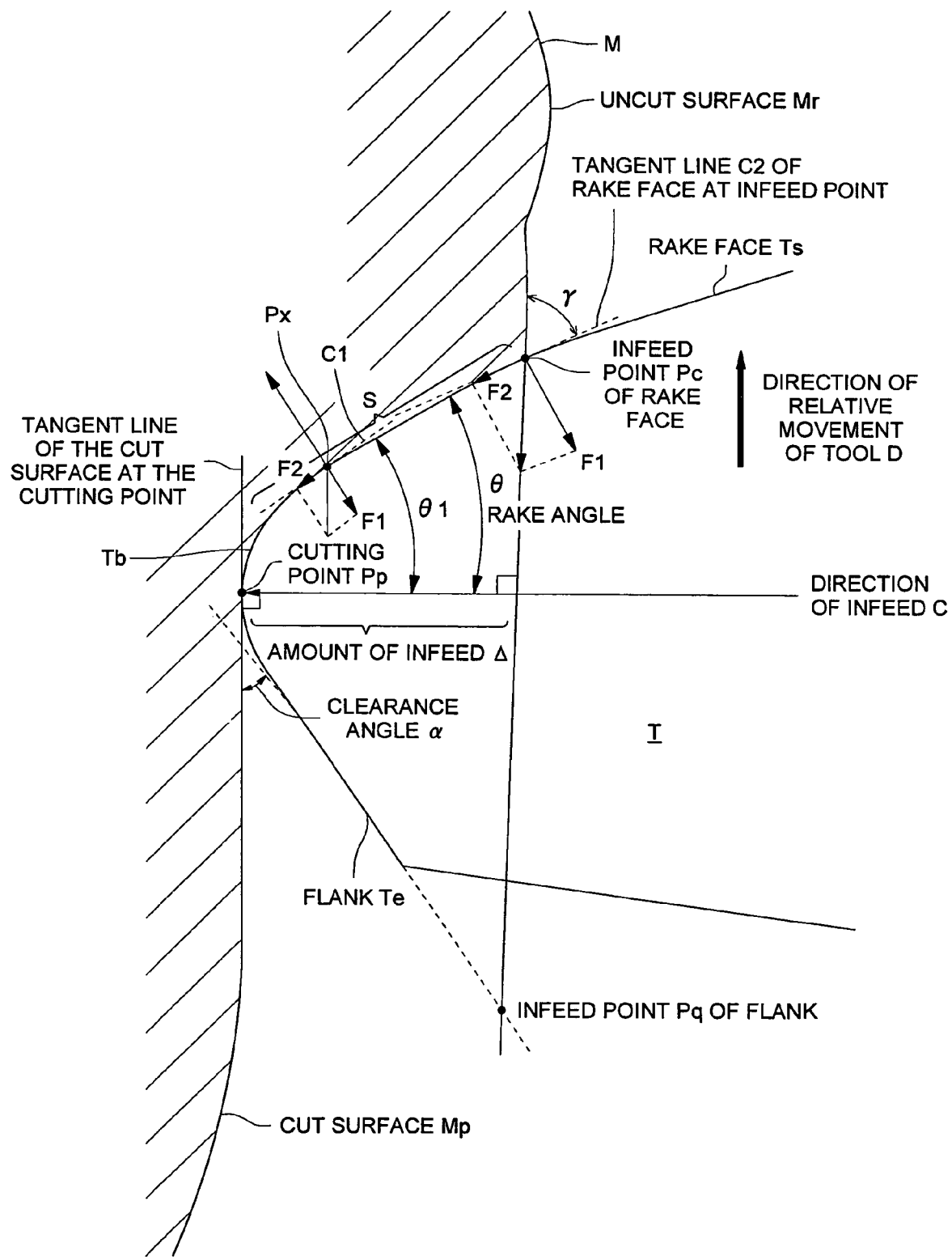
FIG. 1 is a diagram representing the tool T cutting a workpiece M.

FIG. 1 is intended to explain the principle of the present invention, and represents the tool T cutting a workpiece M.

FIG. 1 shows the condition that the relative moving direction D of the tool T to the workpiece M is supposed as a plane to be parallel to the surface of the drawing sheet and the workpiece M is machined with the tool T. The terms used in the present specification will be defined with reference to FIG. 1.

The term "rake face" is defined as the surface Ts for contributing the cutting of the workpiece M by a tool (cutting tool) T. In the following description, the rake face will also be referred to as the cutting tip rake face, which is synonymous with the rake face.

The term "tool tip cutting area" refers to the area S for generating chips from the tool tip when viewed from a plane perpendicular to the direction of relative movement D of the tool T with respect to the cut surface Mp of the workpiece M, as shown in FIG. 1. It refers to, among the rake face Ts, an area from the tip end of the rake face Ts up to the infeed depth (incising depth) (infeed point Pc of the rake face) of the workpiece M with respect to the uncut surface Mr when viewed from the projection (equivalent to cross section) onto the plane perpendicular to the cut surface Mp including the direction of relative movement D.

The term "infeed direction" can be defined as the direction C in which one goes toward the cut surface Mp along the normal line of the point or line in contact with the tool tip, on the cut surface Mp wherein the tangential plane of the cut surface Mp (machined surface) is parallel to the direction of relative movement D of the tool T.

The term "cutting point" refers to the tool tip point Pp or line located at the extreme tip end in the infeed direction C. In the case of a flat point tool, the tip end point is a line, not a point in the strict sense of the word, but either the point or line will be called a cutting point in the following description.

The term "infeed point of rake face" is defined as the intersection Pc between the rake face Ts of the cutting tip and an uncut surface Mr.

The term "infeed point" of flank refers to the intersection Pq between a line extending perpendicularly to the infeed direction C from the infeed point Pc of the rake face and a tool flank Te or the extended surface thereof.

The term "amount of infeed" is also called infeed depth. It refers to the distance $\Delta$ between the infeed point of rake face Pc in a direction along the infeed direction C and the cutting point Pp.

The term "cross section" is defined as the cross section including the infeed direction C and direction of relative movement D at a desired cutting point Pp. Normally, it is represented by the cross section including the infeed direction C and direction of relative movement D at the cutting point Pp wherein the amount of infeed is maximized.

The term "rake angle" is also called the cutting tip rake angle. It refers to the angle $\theta$ formed by the tangent line on the rage face Ts at the infeed point Pc of the rake face and the direction reverse to the infeed direction C. The direction reverse to the infeed direction C is 0°, and the direction D of relative movement D of the tool to the direction reverse to the infeed direction C is −90° (the direction of relative movement of the rake face Ts being reverse to the direction of the relative movement D of the tool is 90°). To put it another way, the negative value of the rake angle $\theta$ is in the range of −90°<$\theta$<0. In other words, minus values of the rake angle $\theta$ means that an angle $\gamma$ formed by a tangent line on the rake face at the infeed point of the rake face and the direction D of relative movement D of the tool satisfies the formula (0°<$\gamma$<90°).

The term "clearance angle" is defined as the angle $\alpha$ formed by the tangent line of the tool flank Te or the extension thereof at the infeed point Pq on a flank surface and the tangent line of the cut surface Mp at the cutting point Pp.

Assume that the rake angle $\theta$ is negative at the infeed point Pc. Then the vector of the cutting resistance applied to the tip of the tool T is decomposed into the force component F2 parallel to the rake face Ts and force component F1 perpendicular to it, as shown in FIG. 1. In this case, the force component F1 is directed inside the tool tip, whereby this force is received by the entire tool tip. Further, the force component F2 is the force for pulling the tool tip along the rake face Ts. This is an external force. For example, the diamond is known to have a small coefficient of friction. The tool tip is pulled by friction through this force, and the internal tensile stress produced inside the diamond is much reduced. However, in the conventional diamond tool having a rake angle of 0°, for example, cutting resistance is perpendicular to the rake face Ts, so it is not decomposed into such force components. The entire cutting resistance is received by the sharp tool tip. As a result, a large stress is produced on the rake face Ts. This will easily result in fracture or chipping. To be more specific, if the rake angle $\theta$ is made negative at the infeed point Pc, occurrence of chipping can be minimized and the service life of the tip of the tool T can be drastically prolonged. The material of high hardness M can be cut in the ductile mode with high efficiency.

In FIG. 1, the tool T is continuous with an edge connecting between the rake face Ts and tool flank Te. Another edge Tb can be present in its vicinity. There is no particular restriction to the contour of the edge Tb. In terms of the diameter and length, however, it is preferably 1 μm or less.

The method of machining the transfer optical surface described in Item 2 is the same as the invention described in Item 1 except that the angle of tool tip rake face at the aforementioned infeed point is −60° or more without exceeding −5°.

Item 2 defines the more preferable range of the angle $\theta$ of the rake face Ts of the tool tip. Assume that the angle $\theta$ of the rake face Ts of the tool tip is negative. As described above, the force component spectrum of the cutting resistance applied to the tip of the tool T can be converted into the compression force so that chipping of the tool tip will be minimized. However, if the rake angle $\theta$ is increased too much in the negative direction and is brought excessively close to the −90°, the rake face Ts at the infeed point Pc will come close in parallel to the cut surface. This will cause the workpiece M to slide along the rake face Ts so the workpiece M tends to enter the inside. To solve this problem, the tool tip is used to apply an adequate amount of shearing force to the workpiece M so that the generation of chips will be improved. To achieve this, the rake angle $\theta$ should not be brought too close to the −90°. Further, to prevent the tool tip from getting loose due to sliding of the work piece M, the tool tip should forcibly be fed into the workpiece M by a highly rigid machine. In the ductile mode cutting operation where a very fine infeed is carried out, a great rigidity is required. If a small and less costly machine available on the market (rigidity: 100 N/μm or less) is to be used to meet this requirement, it is preferred that the rake angle $\theta$ in the negative side should not exceed 60°. The angle $\theta$ of the rake face Ts of the tool tip is preferably greater than −5° in the negative side. This will be more effective in minimizing the chipping of the tool tip, and will prolong the service life of the tool. Thus, cutting in the ductile mode will be carried out with high efficiency.

For the reasons discussed above, if the angle $\theta$ of the rake face Ts of the tool tip is within the range from −5° through −60° at the infeed point, stabilized chip generation can be ensured. For example, a micro-camera lens used in a camera-equipped cellular phone and a digital camera lens having a contour precision of PV=about 100 nm can be produced in a shorter period of time using a material of high hardness, and stable high-precision contour precision and excellent mirror surface can be provided. This method is preferred for this reason.

The method of machining the transfer optical surface described in Item 3 is the same as that in Item 2, except that the angel of the rake face of the tool tip at the aforementioned infeed point is −45° or more without exceeding −15°.

This is the range of angle characterized by the optimum balance wherein machinability (chip generation) is better than that in the range defined in Item 2, and the chipping of the tool tip occurs less frequently. If the rake angle θ within this range is used at the infeed point Pc, the amount of fine infeed can be sustained on a stable basis, despite the normal rigidity of a transfer optical surface cutting machine (100 N/μm). This allows high-precision machining of the transfer optical surface to be performed using a material of high hardness.

For example, when producing a mold for producing an objective lens made of the glass, having a NA of 0.85, of the light pickup apparatus capable of recording and/or reproducing-information using the optical disk of cemented carbide, a blue laser beam being used in the optical disk, ductile mode machining can be provided easily to a contour precision of 50 nm or less, even in the case of a concave aspherical surface wherein the effective diameter of the transfer optical surface is about 3 mm and the maximum angle of normal line (the maximum angle formed by the normal line and optical axis) is 65° or more. This arrangement ensures longer service life of the tool.

The range of the angle defined in Item 3 defines the conditions more fitted to generate a higher-precision transfer optical surface using a material of high hardness. This leads to a substantial reduction in the setup time for tool replacement and others. Further, this method generates the transfer optical surface in a shorter time. Thus, a transfer optical surface can be produced at a lower cost with higher efficiency, and therefore, a high-precision glass-made optical device can be produced on a stable basis at a lower cost with high efficiency.

In the method of machining the transfer optical surface in the optical device producing mold provided with a transfer optical surface made of the material having a Vickers hardness of Hv 1500 or more, the transfer optical surface machining method described in Item 4 is characterized in that the transfer optical surface is generated by cutting with the tool wherein the angle formed by the rake face of the cutting tip and the flank is set to 90° or more. The angle formed by the rake face and the flank in the sense in which it is used here refers to the angle sandwiched by the tangent line in the infeed point Pc of the rake face and the infeed point Pq of the flank in FIG. 1.

In FIG. 1, the flank Te must have clearance angle α with respect to the cut surface Mp. To be more specific, that the angle formed by the rake face Ts and flank Te is set to angle β exceeding 90° means that the rake angle θ of the rake face Ts always assumes a negative value at infeed point Pc, since α+β>90°.

If the rake angle θ assumes a negative value at the infeed point Pc, the vector of the cutting resistance applied to the tip of the tool T is decomposed into the force component F2 parallel to the rake face Ts and the force component F1 perpendicular thereto, as shown in FIG. 1. In this case, the force component F1 is directed inside the tool tip. This allows the force to be received by the entire tool tip. Further, the force component F2 is the force for pulling the tool tip along the rake face Ts. This is an external force. For example, the diamond is known to have a small coefficient of friction. The tool tip is pulled by friction through this force, and the internal tensile stress produced inside the diamond is much reduced. However, in the conventional diamond tool having a rake angle of 0°, for example, cutting resistance is perpendicular to the rake face Ts, so it is not decomposed into such force components. The entire cutting resistance is received by the sharp tool tip. As a result, a large stress is produced on the rake face Ts. This will easily result in fracture or chipping. To be more specific, if the rake angle θ is made negative at the infeed point Pc, occurrence of chipping can be minimized and the service life of the tip of the tool T can be drastically prolonged. The material of high hardness M can be cut in the ductile mode with high efficiency. Further, if the angle formed by the rake face and flank is 90° or more, the thickness of the tool tip is increased, and therefore, the tool tip becomes rigid. This further minimizes the occurrence of chipping.

The method of machining the transfer optical surface described in Item 5 is the same as the invention described in Item 4, except that the angle formed by the rake face of the cutting tip of the tool and the flank is kept at more than 90° without exceeding 145° when machining is performed. The effects and advantages of the present invention are the same as those of Item 2.

The method of machining the transfer optical surface described in Item 6 is the same as the invention described in Item 5 except that the angle formed by the rake face of the cutting tip of the tool and the flank is 100° or more without exceeding 130°, when machining is performed. The effects and advantages of the present invention are the same as those of Item 3.

In the method of machining the transfer optical surface in the optical device producing mold provided with a transfer optical surface made of the material having a Vickers hardness of Hv 1500 or more, the transfer optical surface machining method described in Item 7 is characterized in that the transfer optical surface is generated by cutting wherein the angle formed by the rake face of the cutting tip of the tool and the direction of relative movement of the tool with respect to the material is maintained at less than 90° during the machining operation.

If an angle γ formed by the rake face Ts of the cutting tip of the tool T and the uncut surface Mr of the material M to be machined, more strictly, γ formed by the rake face Ts of the cutting tip of the tool T and the direction of relative movement D of the tool is less than 90° with reference to FIG. 1, the rake angle θ of the rake face Ts always assumes a negative value at infeed point Pc, since −γ+θ=−90°, because an angle formed in an anticlockwise direction for the reverse direction of the infeed direction C is a negative side and −90° of an angle formed the negative maximum value and the direction of relative movement D of the tool.

If the rake angle θ assumes a negative value at the infeed point Pc, the vector of the cutting resistance applied to the tip of the tool T is decomposed into the force component F2 parallel to the rake face Ts and the force component F1 perpendicular thereto, as shown in FIG. 1. In this case, the force component F1 is directed inside the tool tip. This allows the force to be received by the entire tool tip. Further, the force component F2 is the force for pulling the tool tip along the rake face Ts. This is an external force. For example, the diamond is known to have a small coefficient of friction. The tool tip is pulled by friction through this force, and the internal tensile stress produced inside the diamond is much reduced. However, in the conventional diamond tool having a rake angle of 0°, for example, cutting resistance is perpendicular to the rake face Ts, so it is not decomposed into such force components. The entire cutting resistance is received by the sharp tool tip. As a result, a large stress is produced on the rake face Ts. This will easily result in fracture or chipping. To be more specific, if the rake angle θ is made negative at the infeed point Pc, occurrence of chipping can be minimized and the service life of the tip of the tool T can be drastically prolonged. The material of high hardness M can be cut in the ductile mode with high efficiency.

The method of machining the transfer optical surface described in Item 8 is the same as the invention described in Item 7, except that the angle formed by the rake face of the cutting tip of the tool and the direction of relative movement of the tool with respect to the material is kept at more than 30° without exceeding 85' when machining is performed. The effects and advantages of the present invention are the same as those of Item 2.

The method of machining the transfer optical surface described in Item 9 is the same as the invention described in Item 8, except that the angle formed by the rake face of the cutting tip of the tool and the direction of relative movement of the tool with respect to the material is kept at more than 45° without exceeding 75° when machining is performed. The effects and advantages of the present invention are the same as those of Item 3.

In the method of machining the transfer optical surface in the optical device producing mold provided with a transfer optical surface made of the material having a Vickers hardness of Hv 1500 or more, the transfer optical surface machining method described in Item 10 is characterized in that the transfer optical surface is generated by cutting wherein the first tangent line of the rake face of the tool tip at a desired point from the infeed point of the rake face of the tool to the cutting point is inclined in the direction of relative movement of the tool and material with respect to the direction of infeed, and the first angle 1 formed by the first tangent line and the direction of infeed is smaller in the negative side than the second angle formed by the second tangent of the rake face of the tool tip at the infeed point and the direction of infeed.

In FIG. 1, the first tangent line C1 of the rake face Ts of the tip of the tool T at a desired point Px from the infeed point Pc to the cutting point Pp is inclined in the direction of relative movement D of the tool T and workpiece M with respect to the direction of infeed C, and the first angle θ1 formed by the first tangent line C1 and the direction of infeed C is smaller in the negative side than the second angle formed by the second tangent of the rake face of the tool tip at the infeed point and the direction of infeed. To be more specific, the stress working on the rake face Ts of the tool T is smaller as one goes toward the tool tip since θ1<0 and θ1<0. This reduces the possibility of causing the tool to be chipped. It is preferred that the second angle θ2 should also assume a negative value.

Further, if the first angle θ1 assumes a negative value, the vector of the cutting resistance applied to the tip of the tool T at a desired point Px is decomposed into the force component F2 parallel to the rake face Ts and the force component F1 perpendicular thereto, as shown in FIG. 1. In this case, the force component F1 is directed inside the tool tip. This allows the force to be received by the entire tool tip. Further, the force component F2 is the force for pulling the tool tip along the rake face Ts. This is an external force. For example, the diamond is known to have a small coefficient of friction. The tool tip is pulled by friction through this force, and the internal tensile stress produced inside the diamond is much reduced. However, in the conventional diamond tool having a rake angle of 0°, for example, cutting resistance is perpendicular to the rake face Ts, so it is not decomposed into such force components. The entire cutting resistance is received by the sharp tool tip. As a result, a large stress is produced on the rake face Ts. This will easily result in fracture or chipping. To be more specific, if the first angle θ1 is made negative at the infeed point Pc, occurrence of chipping can be minimized and the service life of the tip of the tool T can be drastically prolonged. The material of high hardness M can be cut in the ductile mode with high efficiency.

In the method of machining the transfer optical surface in the optical device producing mold provided with a transfer optical surface made of the material having a Vickers hardness of Hv 1500 or more, the transfer optical surface machining method described in Item 11 is characterized in that the transfer optical surface is generated by cutting wherein the direction of the normal line at a desired point in the machining area of the rake face of the tool is kept in the direction of being sandwiched by the direction of infeed and the direction of tool movement when machining is performed.

In FIG. 1, that the direction of the normal line at a desired point Px in the machining area S of the rake face Ts of the tool T is kept in the direction of being sandwiched by the direction of infeed C and the direction of tool movement D means that the first angle θ1 formed by the first tangent line C1 at a desired point Px and the direction of infeed C assumes a negative value.

If the rake angle θ1 assumes a negative value at the infeed point Pc, the vector of the cutting resistance applied to the tip of the tool T is decomposed into the force component F2 parallel to the rake face Ts and the force component F1 perpendicular thereto, as shown in FIG. 1. In this case, the force component F1 is directed inside the tool tip. This allows the force to be received by the entire tool tip. Further, the force component F2 is the force for pulling the tool tip along the rake face Ts. This is an external force. For example, the diamond is known to have a small coefficient of friction. The tool tip is pulled by friction through this force, and the internal tensile stress produced inside the diamond is much reduced. However, in the conventional diamond tool having a rake angle of 0°, for example, cutting resistance is perpendicular to the rake face Ts, so it is not decomposed into such force components. The entire cutting resistance is received by the sharp tool tip. As a result, a large stress is produced on the rake face Ts. This will easily result in fracture or chipping. To be more specific, if the rake angle θ1 is made negative at the infeed point Pc, occurrence of chipping can be minimized and the service life of the tip of the tool T can be drastically prolonged. The material of high hardness M can be cut in the ductile mode with high efficiency.

The transfer optical surface machining method described in Item 12 is the same as that of any one of the invention Items 1 through 11, wherein the material of the transfer optical surface is a sintered alloy containing 50% or more by mass of cemented carbide or tungsten carbide (WC).

The cemented carbide is an alloy produced by sintering the tungsten carbide particles mixed with a binding agent such as cobalt. If the sintered alloy contains 50% or more by mass of cemented carbide or tungsten carbide, cobalt need not be used as the binding agent or subsidiary material. Nickel or yttrium can be used.

With a Vickers hardness of Hv 1800 or more or Rockwell hardness of HRA 92 or more, these materials are very hard, but are electrically conductive. They can be easily machined by electrical-discharge machining in the step of machining a blank form by rough cutting prior to final cutting. This arrangement reduces the machining cost and shortens the delivery time.

These materials have excellent heat resistance. Namely, in the atmosphere of about 500° C., the mirror surface can be maintained for a longer period of time without being oxidized. Especially when a high pressure is applied hydrostatically (isotropically) and high-temperature sintering is carried out in the argon and other gas atmosphere in the process called the HIP processing, almost no blowhole is observed among WC particles. Thus, these materials provides a composition characterized by compact texture and high bonding force; hence a transfer optical surface with very few surface defects. For this reason, these materials are much preferred.

When the machining method of the present invention is applied to the sintered alloy containing a major component of cemented carbide or tungsten carbide described above, a transfer optical surface of high heat resistance characterized by excellent surface roughness can be produced easily with high efficiency. Thus, this arrangement provides a high-precision glass-made optical device at a low cost on a stable basis.

The transfer optical surface machining method described in Item 13 is the same as that of any one of the invention Items 1 through 11, wherein the material of the transfer optical surface is CVD-SiC or sintered SiC.

Silicon carbide (SiC) is harder more heat-resistant than the cemented carbide or tungsten carbide. The service life of the mold at the time of molding operation is several times longer than that of the cemented carbide or tungsten carbide. In addition to the advantage of producing a high-precision transfer optical surface at a low cost by the machining method of the present invention, this material provides a high-precision glass-made optical device at a low cost on a stable basis.

The transfer optical surface machining method described in Item 14 is the same as that of any one of the invention Items 1 through 13, wherein the tool tip is made of mono-crystalline diamond.

The diamond as a tool tip material is extremely resistant to compression stress and is used even as the indenter of a hardness tester. Thus, if the rake angle of the tool tip assumes a negative value as in the present invention, the chipping of the tool tip can be reduced very effectively by changing the direction of force component of the cutting resistance at the infeed point in the direction of compressing the diamond.

Use of a diamond tool produces a transfer optical surface characterized by high-precision and excellent surface roughness with high efficiency, using a material of high hardness. This machining method provides easy press-molding of a high-performance glass-made optical device at a high yield rate and at a low cost.

Especially, the mono-crystalline diamond allows the tool tip to be finished to a higher precision than the polycrystalline diamond. Thus, use of a mono-crystalline diamond is preferred in high-precision machining. Normally, when a polycrystalline diamond is used, the contour precision of the tool tip is about 1 μm at the maximum. In the case of a mono-crystalline diamond, the contour precision of the tool tip can be improved to the level not more than 30 nm. This high-precision tool tip allows the ductile mode cutting operation of the present invention to be performed, whereby the high-precision contour of the transfer optical surface can be produced with high efficiency.

The transfer optical surface machining method described in Item 15 is the same as that of the Item 14, wherein the crystal orientation <110> of the crystal surface (100) of the aforementioned diamond is arranged within the angle range of plus or minus 15° with respect to infeed direction.

The transfer optical surface machining method described in Item 16 is the same as that of the Item 14, wherein the crystal orientation <110> of the crystal surface (111) of the aforementioned diamond is arranged within the angle range of plus or minus 15° with respect to infeed direction.

The transfer optical surface machining method described in Item 17 is the same as that of the Item 14, wherein the crystal orientation <110> of the crystal surface (110) of the aforementioned diamond is arranged within the angle range of plus or minus 15° with respect to infeed direction.

Since the diamond crystal has an octagonal system, crystal orientation is repeated at every 90°. What is characteristic of a particular crystal orientation manifests itself within the range of plus or minus 30° with respect to the direction thereof. If more prominent characteristic is to be produced, the range of use is preferably with the range of plus or minus 15°. When an extremely hard material is cut, the wear of the tool tip occurs to some extent even if the transfer optical surface as a workpiece has a small diameter. However, what is important is that, as the diameter of the transfer optical surface to be cut is reduced, the overall cut length is reduced. Thus, the wear of the tool tip is becomes very small. This allows high-precision cutting operation to be performed at a lower machining cost. Accordingly, if the cutting point is fixed at one point of the tool tip as in the present invention, or if the range within plus or minus 15° is maintained, then wear of the tool tip used for cutting increases on a monotonous basis, without proceeding on an unstable basis as a result of anisotropy of the tool tip material. Thus, machining contour error of the transfer optical surface caused by the wear of the tool tip exhibits a gradual and monotonous increase in the direction of machining between the center of the optical surface and the periphery thereof. Such a contour error is not subjected to a local abrupt change, and therefore, the correction thereof is easily accomplished by monotonous increase of the amount of the tool tip infeed, for example, at the time of the next cutting operation. To be more specific, the present invention provides the advantage of ensuring high-precision machining of the transfer optical surface of the optical device producing mold, with consideration given to wear of the tool tip resulting from cutting. That "the range within plus or minus 15° is maintained" means that, when a cross section including the optical axis of the transfer optical surface and the cutting point is assumed and a two-dimensional coordinate system using the transfer optical surface as a reference is set, the infeed direction in this coordinate system deflects with respect to the tool at the angle of not more than 30° at the maximum during the machining operation. In this case, there can be no deflection; deflection of 0° is also acceptable.

Figure 9:
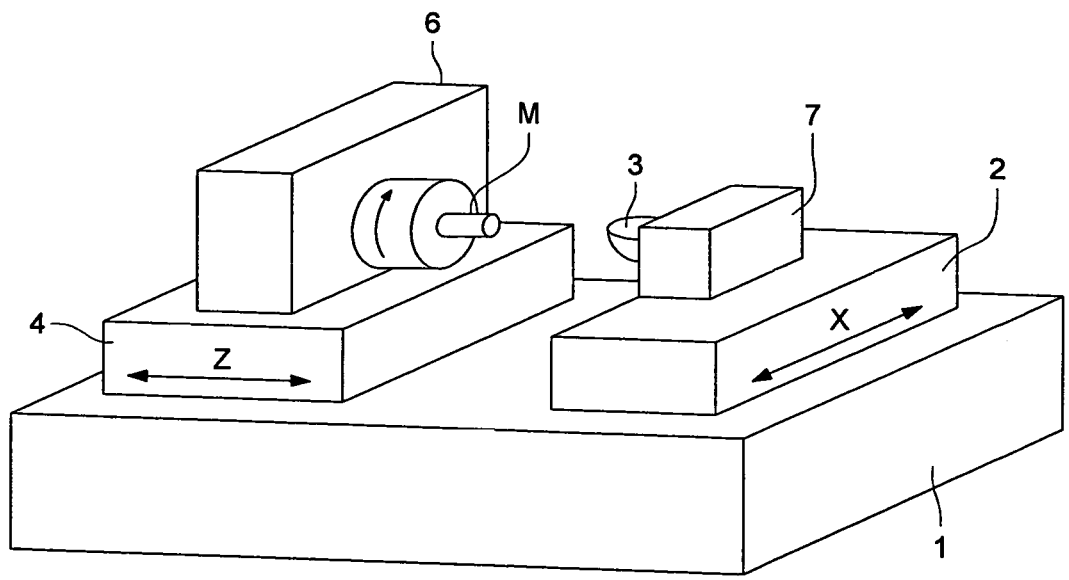
FIG. 9 is a perspective view of a super-precision machine in an embodiment.

When using a diamond tool as a cutting tool, the amount of tool wear is known to be greatly dependent on the crystal orientation of the diamond to be used for the cutting tip. Accordingly, when cutting the transfer optical surface of ceramic material or cemented carbide optical device producing mold, cutting is carried out using only the crystal orientation that minimizes diamond wear. This will prolong the service life of the tool, and will allow a great number of optical device producing molds to be machined. For example, the 2-axis super-precision machine shown in FIG. 9 is used, wherein the tool table of this super-precision machine is equipped with a rotary axis (B-axis). A diamond tool is mounted on the rotary center axis of this machine, wherein this diamond tool is manufactured in such a way that the orientation <110> of the surface (100) or the orientation <110> of the surface (110) where the amount of wear of the diamond tool is minimized will agree with the direction of infeed. In this case, the diamond tool is mounted on the rotary center axis to ensure that the cutting tip is positioned at the cutting point of the transfer optical surface to be machined (so that the cutting point is fixed). Namely, cutting is carried out in the simultaneous 3-axis drive mode so that the crystal orientation where the amount of wear is reduced is always oriented the normal direction of the transfer optical surface. This arrangement reduces the wear of the tool and maintains the contour of the cutting tip under satisfactory conditions along the extensive length. Together with the advantage of keeping the rake angle negative, this arrangement reduces the frequency of tool replacement and saves the time and labor that would otherwise be required. This will minimize the possibility of machine availability being reduced.

Figure 2:
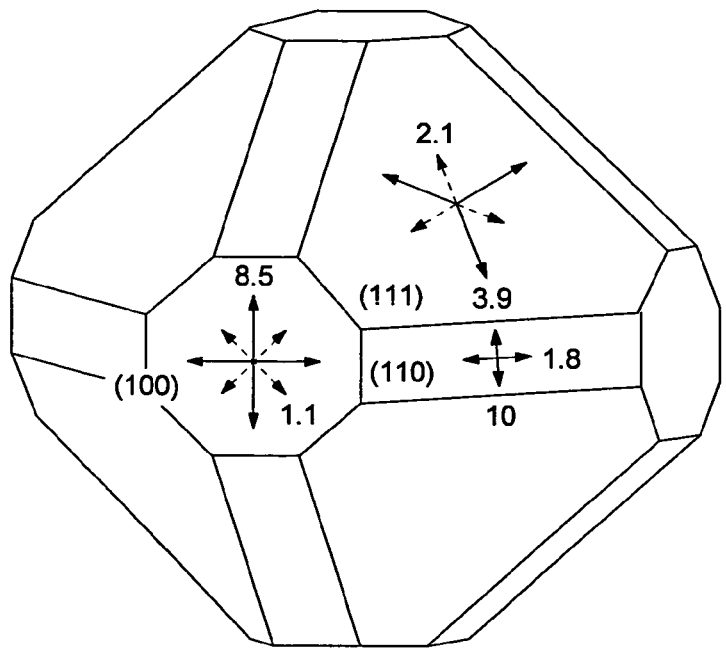
FIG. 2 is a diagram representing the relationship between crystal orientation of a diamond and the amount of wear.

FIG. 2 shows the relationship between the crystal orientation of a diamond and the amount of wear. In FIG. 2, the amount of wear tends to be reduced as the value gets smaller. For example, the 2-axis super-precision machine is used, wherein the tool table of this super-precision machine is equipped with a rotary axis (B-axis). A diamond tool is mounted on the rotary center axis of this machine in such a way that the orientation <110> of the surface (100) or the orientation <110> of the surface (110) where the amount of wear of the diamond tool is minimized will agree with the direction of infeed on the surface to be machined. In this case, the diamond tool is mounted on the rotary center axis to ensure that the cutting tip is positioned at the cutting point of the transfer optical surface to be machined (so that the cutting point is fixed). Namely, cutting is carried out in the simultaneous 3-axis drive mode so that the crystal orientation where the amount of wear is reduced is always oriented the normal direction of the transfer optical surface. This arrangement reduces the wear of the tool and maintains the contour of the cutting tip under satisfactory conditions along the extensive length. Together with the advantage of keeping the rake angle negative, this arrangement reduces the frequency of tool replacement and saves the time and labor that would otherwise be required. This will minimize the possibility of machine availability being reduced.

The transfer optical surface machining method described in Item 18 is the same as that of any one of the Items 1 through 13, wherein the tip of the aforementioned tool is made of CBN (Cubic Boron Nitride). When compared with the CBN with a conventional bonding agent added thereto, the high-purity CBN polycrystalline material is sintered under high pressure without any bonding agent. Accordingly, when applied to the cutting tool tip, the high-purity CBN polycrystalline material provides extremely long service life. The cut surface is also excellent. According to the experiment conducted by the present inventors, an arc-shaped edge was formed to a high precision on a high-purity CBN rake face by grinding with a diamond abrasive grain, and the cemented carbide as a material of high hardness was cut. Further, cutting was carried out under the same conditions, using the tool tip, made of mono-crystalline diamond, having the same contour. The cut surface had an average surface roughness of Ra 4 nm. This cut surface is sufficient as a mirror surface. When compared with the case of using a mono-crystalline diamond, the machined contour is slightly inferior. This is because the CBN-made tool tip material is a polycrystalline member. However, in the case of a transfer optical surface used for the aforementioned camera lens, the required precision is lower, and therefore, there is no problem in practical use.

The transfer optical surface machining method described in Item 19 is the same as that of any one of the Items 1 through 18, wherein the contour of the tool tip on the rake face is generated in an arc form (also called the arc-shaped edge).

Figure 3:
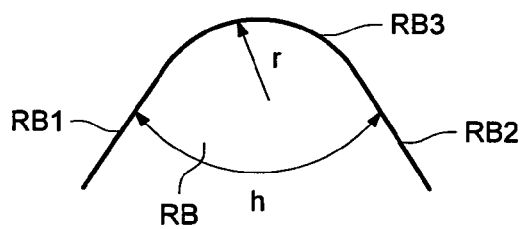
FIG. 3 is a diagram representing an example of the rake face of an arc-shaped tool tip.

FIG. 3 is a diagram of the rake face of the tip contour as viewed from the top (uncut surface side), and represents an example of the arc-shaped rake angle. In FIG. 3, the rake face RB is contoured by a linear first edge RB1, a second edge RB2 extending in the direction crossing the first edge RB1, and an arc- and/or non-arc-shaped third edge RB3 connecting between the first edge RB1 and second edge RB2. Assume that an angle h formed by the first edge RB1 and second edge RB2 is expressed as $30° \le h \le 60°$. When the third edge RB3 is arc-shaped, its radius r is expressed as $0.003 \text{ mm} \le r \le 5 \text{ mm}$. When the third edge RB3 is not arc-shaped, the approximate arc radius r where the squared error is minimized is expressed as $0.003 \text{ mm} \le r \le 5 \text{ mm}$.

A tool with its tip contour having an arc-shaped rake face is called the R tool (radiused tool). This tool provides the advantage of achieving a high degree of roundness with comparative ease in the process of generating an arc-shaped tip contour. Thus, if the present invention is applied to the R tool having such a rake face to perform machining, the high-precision cut contour of a transfer optical surface can be provided by the high-precision tip contour with high efficiency. When generating the transfer optical surface in a 2-axis turning machining by the R tool characterized by a high degree of roundness, as the normal line angle is changed with the progress of cutting, the machining area moves along the arc edge of the tool tip. Thus, once chipping has occurred, ductile mode cutting is changed into brittle cutting; then cutting resistance is increased, and cutting stability will be lost. This will cause chipping to occur successively. The tool tip will continue to be damaged. Thus, the arc-shaped edges of the tool tip subsequent to the first occurrence of chipping will all be damaged, with the result that the tool cannot be used any more. As described above, the R tool contains a wide range of the tool tip edges damaged by chipping in many cases. It is difficult to select the portion free of chipping. The service life of the tool itself is used up. This will result in a very costly cutting operation. However, the present invention ensures a drastic reduction in chipping; hence a remarkable reduction in the damages over such an extensive range. In this sense, the present invention provides a great advantage.

In recent years, in order to improve the optical performance, it has become a common practice to provide a minute contour on the optimal surface to cause diffraction to occur. For example, when a blazed diffraction groove is provided on the optical surface, the diffracted light is made to be converged in a specific direction, whereby light condensing performance is improved in a specific wavelength. Further, a stepwise diffraction groove is provided so that the effect of using the 0-th order light is improved and the diffracted light is used to correct aberration at the same time. Such a minute contour is very small; its magnitude is several times as large as that of the wavelength. Further, the status of diffraction gives a serious effect even if the contour error is just a fraction of that of the wavelength. Micromachining of the transfer optical surface of this optical device is required to meet an extreme high precision cutting requirement. Such a minute contour can be effectively cut by a tool wherein the tip contour of the rake face is formed in a pointed shape.

The transfer optical surface machining method described in Item 20 is the same as that of any one of the Items 1 through 18, wherein the contour of the tool tip on the rake face is generated in a pointed form.

Figure 4:
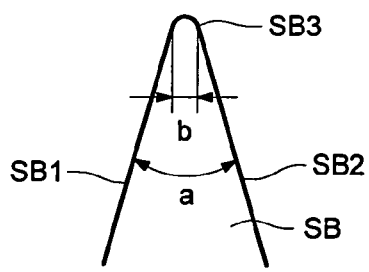
FIG. 4 is a diagram representing an example of the rake face of a pointed tool tip.

FIG. 4 is a diagram representing an example of the rake face of a pointed tool tip. In FIG. 4, the rake surface SB is contoured by linear first edge SB1, a second edge SB2 extending in the direction crossing the first edge SB1, and a third edge SB3 connecting between the first edge SB1 and second edge SB2. Assume that an acute angle a formed by the first edge SB1 and second edge SB2 is expressed as $10° \le a \le 45°$. When the third edge SB3 is arc-shaped, its radius r is expressed as $0.05 \text{ μm} \le r \le 3 \text{ μm}$. When the third edge SB3 is not arc-shaped, it is expressed as 0.1 μm≤b≤5.0 μm where the distance formed by connecting both ends of the third edge SB3 is "b".

A tool with its tip contour having a pointed rake face is called the pointed tool. A pointed tool suitable for micromachining has a sharp edge, and its tip contour is easily broken. The present invention can be preferably applied to this tool. The present invention provides a drastic reduction in chipping as well as tool tip damage, and easily permits high-precision machining of the transfer optical surface of an optical device producing mold made of a material of high hardness having a minute contour (such as diffraction groove) that cannot be machined by the conventional technique. Use of the optical device producing mold allows the blazed diffraction structure to be transfer-molded in the production of optical glass with the GM. This arrangement provides a glass-made optical device, highly resistant to environmental changes, capable of expanding the scope of designing, and ensuring satisfactory aberration correction for a plurality of wavelengths.

The transfer optical surface machining method described in Item 21 is the same as that of any one of the Items 1 through 18, wherein the contour of the tool tip on the rake face is generated in a flat point form.

Figure 5:
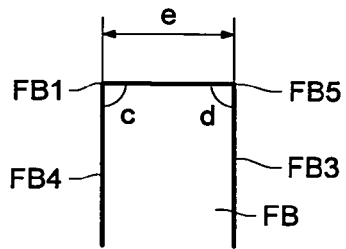
FIG. 5 is a diagram representing an example of the rake face of a flat pointed tool tip.

FIG. 5 is a diagram representing an example of the rake face of a flat pointed tool tip. In FIG. 5, the rake surface FB is contoured by linear first edge FB1, a second edge FB2 extending in the direction crossing the first edge FB1, and a third edge FB3 crossing the second edge FB2. Assume that an angle c formed by the first edge FB1 and second edge FB2 is expressed as 80°≤c≤100°; an angle d formed by the second edge FB2 and third edge FB3 is expressed as 80°≤d≤100°; and the length e of the second edge FB2 is expressed as 2 μm≤e≤5 mm. A fourth edge FB4 made of an arc or straight line can be provided between the first edge FB1 and second edge FB2. A fifth edge FB5 made of an arc or straight line can be provided between the second edge FB2 and third edge FB3.

A tool with its tip contour having a flat-pointed rake face is called the flat point tool. The flat point tool has a tip width ranging from several micrometers through several millimeters. Generally, the ratio of the tip projection relative to the tip width (aspect ratio) is 4 or more. When a load is applied to the tool tip, the tool tip breaks easily, and therefore, the present invention can be preferably applied to this tool. The present invention provides a drastic reduction in chipping as well as tool tip damage, and easily permits high-precision machining of the transfer optical surface of an optical device producing mold made of a material of high hardness having a minute contour (such as diffraction groove) that cannot be machined by the conventional technique. Use of the optical device producing mold allows minute stepwise diffraction structure to be transferred even with the GM. This arrangement provides a glass-made optical device, highly resistant to environmental changes, capable of expanding the scope of designing, and ensuring satisfactory aberration correction for a plurality of wavelengths.

The transfer optical surface machining method described in Item 22 is the same as that of any one of the Items 1 through 18, wherein the contour of the tool tip on the rake face is generated in a semicircular form.

Figure 6:
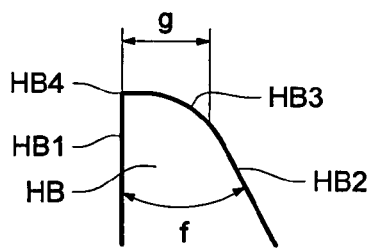
FIG. 6 is a diagram representing an example of the rake face of a semicircular tool tip.

FIG. 6 is a diagram representing an example of the rake face of a semicircular tool tip. In FIG. 6, the rake surface HB is contoured by linear first edge HB1, a second edge HB2 extending in the direction crossing the first edge HB1, and an arc- and/or non-arc-shaped third edge HB3, forming an angle with the first edge HB1, smoothly connected with the second edge HB2. Assume that an angle formed by the first edge HB1 and second edge HB2 is expressed as 0°<f<90°. When the third edge HB3 is arc-shaped, its radius r is expressed as 0.1 μm≤r≤5 mm. When the third edge is not arc-shaped, it is expressed as 0.1 μm≤g≤5 mm where the distance formed by connecting both ends of the third edge HB3 is "g". A fourth edge HB4 made of a convex arc or straight line can be provided between the first edge HB1 and third edge HB3.

A tool with its tip contour having a semicircular rake face is called the semicircular tool. The present invention allows high-precision machining of a mold having a minute contour (such as diffraction groove) that cannot be machined by the conventional technique due to breakdown of the tool tip. If a semicircular tool is used, the aspherical surface is machined by the radiused portion of the tool. This allows a smooth transfer optical surface to be machined, with the result that scattering of the light from the optical surface of the optical device transferred thereby is minimized. Further, the blazed portion is machined by the sharp portion of the semicircular tool, and therefore, the reduction of diffraction efficiency is minimized. If the optical device producing mold machined by a semicircular tool is used, the blazed diffraction structure can be transferred even with the GM. This arrangement provides a glass-made optical device, highly resistant to environmental changes, capable of expanding the scope of designing, and ensuring satisfactory aberration correction for a plurality of wavelengths.

The transfer optical surface machining method described in Item 23 is the same as that of any one of the Items 1 through 22, wherein the aforementioned cutting is provided by turning operation.

Once the tool tip is fed into a workpiece, turning operation is carried out on a continuous basis until turning terminates. This means that only a small load is applied to the cutting tool. Accordingly, combined with the present invention, this machining method brings about a drastic reduction of chipping of the tool tip, and ensures the extended service life of the tool and easy production of a mirror finish surface capable of producing a high-precision transfer optical surface contour at a reduced cost. Further, the machine itself is provided with a simple movable axis structure, and the machine can be manufactured at a lower cost. This ensures economical production of an axisymmetric optical device producing mold. To be more specific, a glass-made optical device producing mold can be manufactured with high efficiency at a low cost, and therefore, economical production of a high-performance optical device with high efficiency is provided by this method.

The transfer optical surface machining method described in Item 24 is the same as that of any one of the Items 1 through 23, wherein a machine equipped with rotary axis is used for machining.

When a machine is equipped with a rotary axis, machining operation can be performed in the ductile mode cutting operation with the cutting range of the tool tip fixed at a predetermined position, and the cutting range of the tool tip need not be changed during the cutting operation. Thus, the contour precision of the cutting edge line of the tool tip is not affected during the machining operation. By contrast, if there is no rotary axis and the cutting edge line is changed during the machining by the cutting point or machining range during the machining, the crystal orientation of the diamond in the machining range is changed concurrently. When the crystal orientation that easily causes wear or chipping is taken into account, the tool tip may be worn by repeated machining at that position or chipping may occur. In the former case, the contour error corresponding to the amount of wear will occur to the cutting contour at that position. In the latter case, the cutting mode is changed into the brittle cutting mode, and a mirror surface cannot be obtained. In the case of a machine equipped with a rotary axis, the machining area of the tool tip can be secured in position, and the crystal orientation of the diamond to be used is also secured in position. This machining method avoids the aforementioned contour error or deterioration of the machined surface. Further, since the machining area is secured in position, the crystal orientation of the diamond at that position can be changed to the crystal orientation where the wear is reduced. Under this condition, machining is performed. This procedure will ensure high-performance machining and will drastically prolong the service life of the tool in the face of tool wear. Together with the advantage of drastic reduction of possible chipping of the tool tip in the present invention, this arrangement produces a transfer optical surface from the material of high hardness at a lower cost in a shorter time. Without being restricted to the turning machine equipped with a spindle, the machine with a rotary axis includes an orthogonal 3-axis machine without a spindle. The advantages obtained from the rotary axis are provided by either of them by a machine of other axis structure when the aforementioned tool tip machining area is secured in position.

The transfer optical surface machining method described in Item 25 is the same as that of any one of the Items 1 through 22, wherein the aforementioned cutting is provided by fly cutting operation.

In the machining method based on fly cutting technique, a cutting tip is provided on the side of the rotary axis, which is moved so that arc-shaped cutting ranges are superimposed, whereby a cut surface is generated. The amount of infeed per rotation can be reduced by increasing the rotary speed, hence the load on the tool is reduced. This allows the tool tip to be fed at a high speed in the direction orthogonal to the rotary axis. This provides an effective method for cutting a slender transfer optical surface having a comparatively gradual curvature. However, in this cutting method, the infeed of the tool tip is intermittent, not continuous as in the case of turning operation. Accordingly, even if the amount of infeed can be reduced, cutting resistance as an intermittent impact is applied to the tool tip. This tends to cause chipping more frequently. By contrast, the present invention reduces the chipping despite the material of high hardness and produces a transfer optical surface of a free formed contour. In contrast to the method of grinding operation, there is no change in tool contour, tool wear or elastic deformation of the tool. Thus, this arrangement provides a high-performance cut contour wherein the operation precision of a machining apparatus is transferred, and easily produces a mirror surface in a short time. According to the conventional method, fly cutting of a material of high hardness has been impossible. The present invention provides the first method for fly cutting of such a material. When compared with the graduating technique, this arrangement is characterized by smaller cutting resistance and tool chipping frequency, and allows the feed rate to be increased. The present method easily produces a high-precision mirror surface in a short time in the case of a free formed contour.

The transfer optical surface machining method described in Item 26 is the same as that of any one of the Items 1 through 22, wherein the aforementioned cutting is provided by milling operation.

In the milling operation, the end face of the rotary axis is provided with a cutting tip, which is moved so that arc-shaped cutting ranges are superimposed, whereby a cut surface is generated. The amount of infeed per rotation can be reduced by increasing the rotary speed, hence the load on the tool is reduced. This allows the tool tip to be fed at a high speed in the direction orthogonal to the rotary axis. This provides an effective method for cutting a transfer optical surface, close to a flat plane, having a large area. A material of high hardness is machined by milling operation according to the present invention, wherein the possibility of chipping is reduced. This method permits very easy cutting of a free formed contour or high-precision flat surface in a short time. In contrast to the method of grinding operation, there is no change in tool contour, tool wear or elastic deformation of the tool. Thus, this arrangement provides a high-precision cut contour wherein the operation precision of a machining apparatus is transferred, and easily produces a mirror surface in a short time. According to the conventional method, milling of a material of high hardness has been impossible. The present invention provides the first method for milling such a material, and allows machining of a complicated curvature having a high-precision contour and mirror surface and stepped-machining.

The transfer optical surface machining method described in Item 27 is the same as that of any one of the Items 1 through 22, wherein the aforementioned cutting is provided by graduating operation.

In graduating operation, the loci of the cutting tool are superimposed on one another through the reciprocating motion of the cutting tool, whereby a cut surface is generated. Especially, even when cutting a concave surface of heavy curvature and a complicated cutting contour, high-precision machining can be ensured without interference of the tool. What should be noted in this cutting method is that the tool tip does not rotate, differently from the case of fly cutting or milling. The same amount of infeed is ensured from the initial cutting to the final cutting. Accordingly, when the initial cutting is made, a large cutting resistance is applied. Normally, in this machining method, chipping occurs to the tool tip in the phase of initial cutting in most cases. Accordingly, there has been no concept of graduating operation of a material of high hardness in the conventional art. However, application of the present invention reduces the possibility of chipping even when cutting a material of high hardness, and allows a free formed contour to be cut. Moreover, compared with the conventional method of cutting, this method is completely unrelated to the change in tool contour, tool wear or elastic deformation of the tool. This arrangement easily provides a high-precision cut contour and mirror surface wherein the operation precision of a machining apparatus is transferred. There has been no concept of applying graduating operation to the material of high hardness in the conventional art, and the present invention is the first arrangement to realize this concept.

The transfer optical surface machining method described in Item 28 is the same as that of any one of the Items 1 through 27, wherein the aforementioned cutting is provided by using a machining apparatus equipped with a 3- or more-axis movable portion. A machine with many movable axes ensures easy setup for machining operation. A combination of this arrangement with the present invention eliminates the need of creating a program for tool contour correction or correction of complicated contours such as tool wear during machining. A high-precision mirror finish can be produced without wasting time and labor. The present invention can be used with a machine having a movable portion of two or less axes.

The transfer optical surface machining method described in Item 29 is the same as that of any one of the Items 1 through 28, wherein the contour generated by the aforementioned cutting method is spherical or aspherical.

The transfer optical surface of an optical device producing mold machined according to the present invention has a high-precision spherical or aspherical contour and a mirror surface. Use of such an optical device producing mold easily provides an optical device of high optical performances.

The transfer optical surface machining method described in Item 30 is the same as that of any one of the Items 1 through 28, wherein the contour generated by the aforementioned cutting method is free formed (non-axisymmetric and aspherical).

The transfer optical surface of the optical device producing mold machined according to the present invention has a high-precision contour and mirror surface. Use of such an optical device producing mold easily provides an optical device of high optical performances.

The transfer optical surface machining method described in Item 31 is the same as that of any one of the Items 1 through 30, wherein the maximum normal line angle of the transfer optical surface generated by the aforementioned cutting method is 30° or more.

In the conventional method, when the surface contour has a greater depth, the size of the grinding wheel is reduced in order to avoid interference with the transfer optical surface. This increases the number of the abrasive grains contributing to grinding operation, and hence increases in the amount of tool wear. Thus the conventional method is not suited for generation of a high-precision contour. Further, a small grinding wheel has a small rigidity and the rotary axis is also small. Thus, such a grinding wheel is subjected to deflection due to grinding resistance. This makes it difficult to provide a forcible infeed of the cutting edge of an abrasive grain. This technique has tended to become pressure transfer machining. Such a machining method is a cutting method with unstable loads based on the principle of self-regeneration of a cutting tip. Thus, high-precision machining of a deep transfer optical surface whose maximum normal line angle is more than 30° has been very difficult. In the recent years, for example, there have been an increasing number of GM optical devices having a normal line angle of 70°. Use of the present invention provides the mold for producing an optical device having a high-precision contour and mirror surface. An optical device transfer-molded by this product produces a high-precision optical device at a lower cost on a stable basis.

The transfer optical surface machining method described in Item 32 is the same as that of any one of the Items 1 through 31, wherein the aforementioned cutting is performed at an infeed depth of less than 0.5 µm per cycle.

Especially when cutting a material of high hardness according to the present invention, the infeed of 0.5 µm or less ensures a drastic reduction of chipping of the tool tip. Accordingly, the ductile mode cutting can be continued on a stable basis, and a high-precision cut contour and mirror surface can be obtained easily with high efficiency.

The transfer optical surface machining method described in Item 33 is the same as that of any one of the Items 1 through 32, wherein the aforementioned cutting is carried out at a feed pitch of 20 µm or less.

Cutting the material of high hardness feed pitch of 20 µm or less provides excellent surface roughness on the cut surface (e.g. Ra 2 through 3 nm). This ensures a high-definition transfer optical surface. The feed pitch in the sense in which it is used here refers to the unit of feed wherein the cutting loci of the tool tip are superimposed on one another in the direction orthogonal to the direction of relative tool movement. For example, in the turning operation, it corresponds to the amount of feed of the tool per rotation of a workpiece. In the fly cutting operation, it corresponds to the unit of feed in the direction of rotary axis of the tool. In the milling operation, it corresponds to the unit of feed in one rotation of the tool tip. In the graduating operation, it corresponds to the unit of feed in one reciprocating motion of the tool. On the cut surface, the cutting mark of the tool tip is repeated at this feed pitch. If this feed pitch is excessively large, the cutting resistance will increase and the state of machining is drastically changed by the rigidity of the cutting apparatus. In an apparatus of low rigidity, the tool tip slides over the cut surface or hits it due to vibration, with the result that the precision of the cut surface is deteriorated. In the cutting machine available on the market, the relative rigidity between the workpiece and tool is 100 N/µm or less. If the feed pitch of 20 µm or less is used, the amount of feed can be maintained constant during the machining operation. Thus, ductile mode cutting can be performed on a stable basis, and, a high-precision transfer optical surface with excellent mirror surface can be obtained.

The transfer optical surface machining method described in Item 34 is the same as that of any one of the Items 1 through 33, wherein the aforementioned optical device producing mold is ground after having been cut.

In the present invention, a negative value is assigned to the rake face of the tool tip. This arrangement results in a drastic reduction of chipping, and ensures effective generation of a transfer optical surface by ductile mode cutting. Further, the transfer optical surface is polished. This provides a high-precision contour and excellent surface roughness, without deforming the cut contour. The feed rate and feed pitch in the cutting operation can be increased on condition that polishing is performed subsequent to cutting, whereby the cutting time is reduced. In this case, use of the cutting method according to the present invention reduces the possibility of chipping. It should be noted that polishing can be completed in several minutes.

The polishing operation subsequent to cutting is effective for the following reasons: Firstly, since a material of high hardness is used, the amount to be removed by polishing is very small, and polishing is carried out at a low speed. This makes it easy to perform uniform polishing of the entire transfer optical surface with time. Secondly, the difference in the heights of the tool marks produced by ductile mode cutting is very small; it is about 10 through 20 nm at most. Moreover, the entire transfer optical surface has approximately the same size and is uniform. This makes it easy to remove the entire portion by polishing. In the conventional polishing method, scratches caused by abrasive grain are removed in the subsequent polishing process. After all, the entire portion must be uniformly polished for a long time, until the deepest scratch located at only a very limited position is removed. This difficulty in the conventional method has deformed the transfer optical surface generated in the previous steps.

According to the present invention, the surface roughness is uniform as compared to that in the grinding process. This permits uniform polishing to be completed in a shorter time without deforming the contour. As a result, even if the cutting time is reduced, chipping of the tool tip does not occur. A high-precision transfer optical surface with excellent surface roughness can be obtained easily in a shorter time.

The transfer optical surface machining method described in Item 35 is the same as that of any one of the Items 1 through 34, wherein a film is formed on the transfer optical surface subsequent to the cutting operation thereof.

When a DLC (diamond-like carbon) or Cr film of 1 µm or less is formed on the transfer optical surface, oxidation of the optical device producing mold is prevented, and the mold releasing property of the transferred optical device can be improved. At the same time, this arrangement ensures a substantial increase in the service life of the mold at the time of molding. It goes without saying that a film can be formed on the area except for the transfer optical surface, for example, on the surface around the transfer optical surface.

The optical device producing mold described in Item 36 has a transfer optical surface machined according to any one of the machining methods of the Items 1 through 35, wherein the surface roughness of the transfer optical surface having been machined is Ra 15 nm or less.

An optical device having excellent optical properties can be provided on a stable basis at a lower cost by the optical device producing mold having a transfer optical surface equipped with a high-precision contour and mirror surface.

The optical device described in Item 37 has a transfer optical surface having been transferred by the optical device producing mold of Item 36.

The optical device producing mold described in Item 38 has a transfer optical surface machined according to any one of the machining methods of the Items 1 through 35, wherein the transfer optical surface having been machined has a minute contour.

The optical device producing mold having a transfer optical surface characterized by high-precision contour and mirror surface ensures a stable supply of a low-cost optical device having excellent optical properties resulting from the high-precision minute contour having been transferred. The minute contour formed on the optical surface of the optical device in this manner includes a diffraction structure.

The optical device described in Item 39 has a transfer optical surface having been transferred by the optical device producing mold of Item 38, wherein the transfer optical surface having been machined has a minute contour.

The optical device of Item 40 is the same as that of Item 37 or 39, wherein the outer peripheral surface of the optical device is machined after having been transferred by the optical device producing mold.

For example, when there is a large difference in thicknesses of the glass-made optical device at the center and periphery, the optical device tends to be affected by shrinkage eccentricity. This requires the molding conditions to be determined, with greater emphasis placed on the optical surface precision. This makes it difficult to form an outer diameter contour outside the optical surface with high precision. To solve this problem, grinding (centering operation) is performed after molding and the outer diameter contour is adjusted. This arrangement provides the high-precision glass-made optical device capable of high-precision mounting on the optical unit. Especially the objective lens of an optical disk pickup apparatus has a large difference in thickness at the center and periphery. Thus, easy assembling and high-precision of the optical device are ensured by post-machining of the outer periphery of the lens flange.

The optical device of Item 41 is the same as that of Item 37 or 39, wherein the aforementioned optical device is produced by compaction molding method.

Generally, when an optical device is produced by a glass mold, high-precision formation of the external shape is difficult. When the outer diameter is not cylindrical, time and labor will be required if centering operation is performed in the post-processing step. This tends to cause a machining error and other problems. To solve this problem, when the outer diameter shape is not cylindrical, the outer diameter shape is preferably formed concurrently with molding, according to the compaction molding method wherein an optical glass material is press-molded inside the mold having an enclosed cavity. This arrangement allows the centering step to be omitted, whereby low-cost production can be achieved.

The optical device of Item 42 is the same as that of any one of Item 37 and 39 through 41, wherein an antireflection film is formed on the optical surface of the optical device.

According to the machining method of the present invention, a transfer optical surface of very high precision and excellent surface roughness can be produced with high efficiency from a material of high hardness. The optical surface of the optical device formed by transfer therefrom has a high degree of definition. When an antireflection film is formed, transmittance is improved. For the blue laser beam having a wavelength of 405 nm, for example, transmittance can be easily made 97% or more by formation of an adequate antireflection film. In the optical device having a microstructure, the minute contour of the microstructure on the transfer optical surface of the optical device producing mold machined according to the present invention is transferred with high precision. Thus, the molded optical device has almost ideal diffraction efficiency. When the antireflection film is formed on this surface, an optical device characterized by almost ideal performances can be produced.

The optical device of Item 43 is the same as that of any one of Item 37 and 39 through 42, wherein a reflection mirror is formed on the optical surface of the optical device.

According to the machining method of the present invention, a transfer optical surface of very high precision and excellent surface roughness can be produced with high efficiency from a material of high hardness. The optical surface of the optical device formed by transfer therefrom has a high degree of definition. When a reflection mirror is formed, a high-quality optical device characterized by high reflectivity and high optical performance can be produced. Especially in the reflection optical system, the contour precision of the reflection optical surface is required to four times as high as that of the optical surface of the transmission/refraction type optical surface, in principle. The optical surface of high-precision and excellent surface roughness can be obtained from the transfer optical surface of the optical device producing mold machined according to the present invention. This fact is very effective in improving the yield and productivity of a reflection type optical device. Further, in the reflection optical device for producing a minute diffraction structure, the minute contour of the optical device producing mold machined according to the present invention can be machined to high precision, and therefore, the optical device molded by transfer has an almost ideal diffraction efficiency. When this surface is provided with reflection coating, a reflection type diffraction optical device having an almost ideal performance can be produced.

The optical device of Item 44 is the same as that of any one of Item 37 and 39 through 43, wherein a film of wavelength selectivity is formed on the optical surface of the optical device.

According to the machining method of the present invention, a transfer optical surface of very high precision and excellent surface roughness can be produced with high efficiency from a material of high hardness. The optical surface of the optical device formed by transfer therefrom has a high degree of definition. When a film having a wavelength selectivity is formed, the scattering of light is reduced, whereby a high-quality optical device characterized by a high degree of wavelength selectivity and high optical performance can be produced.

The optical device of Item 45 is the same as that of any one of Item 37 and 39 through 44 wherein the aforementioned optical device is cleaned after transfer molding.

According to the machining method of the present invention, a transfer optical surface of very high precision and excellent surface roughness can be produced with high efficiency from a material of high hardness. However, the quality will be lowered by slight contamination of the transfer optical surface having been machined. The transfer optical surface and the molded optical surface of the optical device having been molded thereby are carefully cleaned. This procedure removes impurities from the surface and produces a high-precision optical device of stabilized quality with high efficiency.

The optical device of Item 46 is the same as that of any one of Item 37 and 39 through 44 wherein the aforementioned optical device is used in an optical pickup apparatus for recording and/or reproduction of information using a luminous flux having a wavelength of 450 nm or less. The luminous flux of a violet blue laser is preferably used as the luminous flux having a wavelength of 450 nm or less.

The luminous flux having a wavelength of 450 nm or less tends to scatter on the optical surface of the optical device. According to the machining method of the present invention, a transfer optical surface of very high precision and excellent surface roughness can be produced with high efficiency from a material of high hardness. The optical surface of the optical device formed by transfer therefrom has a high degree of definition, and effectively reduces the scattering of light. Accordingly, a high light transmittance can be maintained even when a plurality of such optical devices are arranged one on top of another.

The present invention reduces tool chipping and prolongs the tool service life when machining the material of high hardness used in the optical device producing mold. It provides a transfer optical surface machining method for continuous high-precision machining of the transfer optical surfaces of multiple optical device producing molds using only one tool and, an optical device producing mold produced by this method, and an optical device produced thereby.

Figure 11:
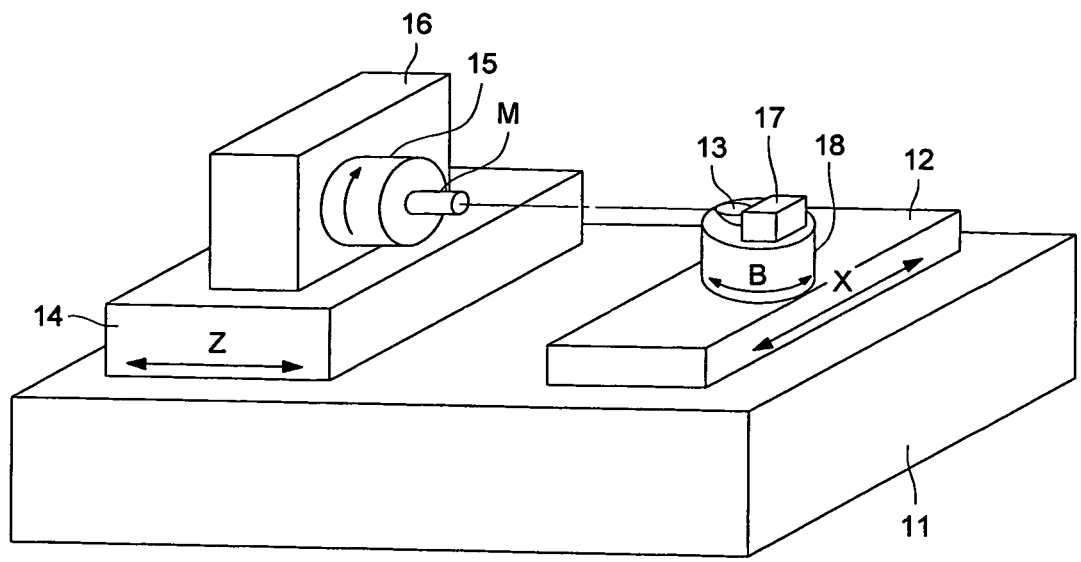
FIG. 11 is a perspective view of a super-precision machine in an embodiment of the present invention.

An embodiment of the invention will be explained as follows, referring to the drawings. A method of processing a transfer optical surface relating to the embodiment of the invention can be practiced by a superfine processing machine shown in FIG. 11. FIG. 11 is a perspective view of the superfine processing machine relating to the embodiment of the invention. In FIG. 11, X-axis table 12 that is driven in the X-axis direction and Z-axis table 14 that is driven in the Z-axis direction are mounted on machine platen 11. On the X-axis table 12, there is fixed pivot shaft (shaft-B) 18 that can rotate tool 13, and on the pivot shaft 18, there is fixed tool attaching section 17. On the Z-axis table 14, there is arranged spindle 15 that is driven to rotate by rotation drive mechanism 16. Workpiece M to be processed is clamped on the spindle 15.

Figure 10:
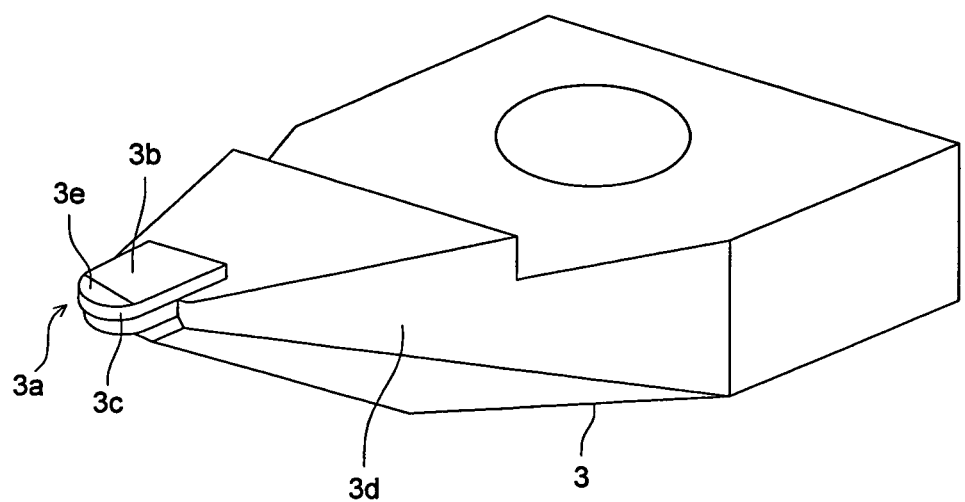
FIG. 10 is a perspective view of a diamond tool.

As shown in FIG. 10, diamond tip 3a is fixed on a tip of diamond tool 3 representing a cutting tool. Incidentally, in this case, 3b represents a rake face, 3c represents a flank and 3d represents a shank, and in the case of cutting operations, the rake face (cutting face) 3b is held in the direction that is perpendicular substantially to the cutting surface of the workpiece M, and cutting operations are conducted when the aforesaid two are moved relatively in the direction of a normal line on the rake face 3b. Meanwhile, a tip of the rake face 3b is made to be angled tapered surface 3e, thus, a face angle formed by the cutting surface and the tapered surface 3e is kept to be in a range of −5°--60°.

EXAMPLE 1

The inventors of the invention practiced the method of processing of the invention by using the superfine processing machine shown in FIG. 11. Tungsten carbide (hereinafter referred to as WC) of RCC-FN (Vickers hardness Hv=2500) manufactured by Nippon Tungsten Co., Ltd. was used as a material of the workpiece. A form of an aspheric surface transfer optical surface representing an object to be processed is a concave transfer optical surface that is small and deep having approximate R concave of about 0.9 mm, central radius of curvature of 1.4 mm and an angle of maximum likelihood of 65°.

A surface to become a transfer optical surface on the workpiece was processed by electrical discharge machining in advance to become a concave spherical surface, and was further machined roughly to become a form of aspheric surface from an approximate aspheric surface, by a general purpose precision grinding machine having an axial resolution of about 100 mm. In this roughing grinding processing, an electrodeposition grind stone was used to attain a form of aspheric surface by finishing up to a precision of a form of about 1 μm in a short period of time, while repeating form corrections.

The workpiece which has been subjected to preliminary processing in this way was clamped on the superfine processing machine shown in FIG. 11 to be subjected to finishing cutting operations. In this case, a diamond tool is an R-cutter, rake face arc radius of a cutting edge is 0.5 mm, an angle of flank is 5°, an angle formed by a rake face at a cutting edge point is −25° and a depth of cut in this case is 0.2 μm. Cutting operations were carried out under the condition that the number of rotations of the spindle on which the workpiece was clamped was 340 r.p.m. and the feed rate was 0.2 mm/min.

Figure 12:
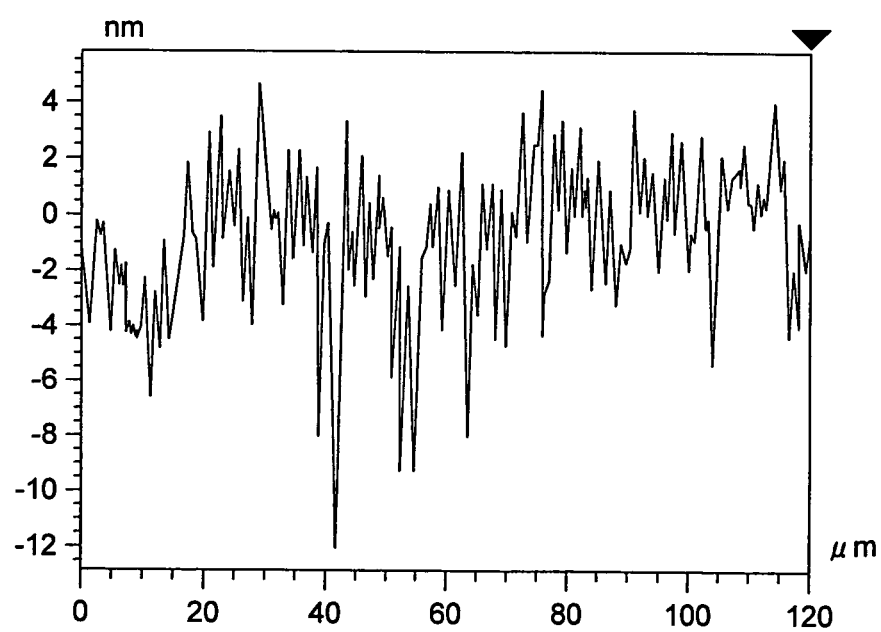
FIG. 12 is a diagram showing the result of measuring the roughness of the cut surfaces in the present invention.
Figure 13:
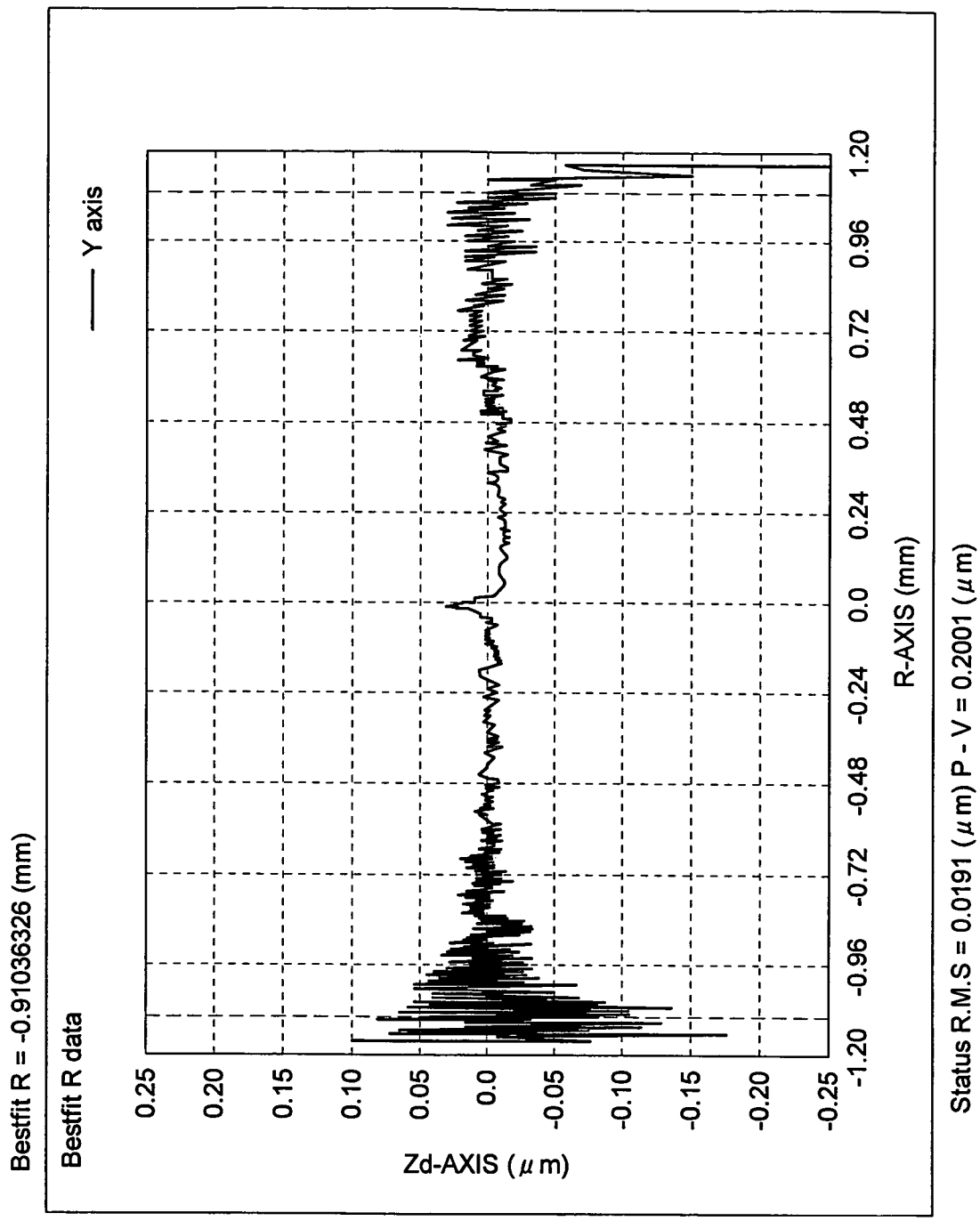
FIG. 13 is a diagram representing the result of measuring a contour error.

After the cutting operations, a roughness of the transfer optical surface was measured by the use of the surface roughness tester HD 3300 made by WYKO Co. Results of the measurement are shown in FIG. 12. As is apparent from FIG. 12, a mean surface roughness is Ra 2.15 nm, and a mirror surface which is satisfactory for practical use was obtained. On the other hand, a precision of a processed form was measured by three-dimensional measuring instrument UA3P manufactured by Matsushita Electric Industrial Co. Ltd. As a result of the measurement, an error of the form of about 100 nmPV was observed after the first processing. Therefore, the processing for the correction was conducted by correcting the NC program so that an error of the form may be corrected. Results of the measurement are shown in FIG. 13. As is apparent from FIG. 13, a single processing for the correction of this kind made it possible to obtain a result that an error in the processed form is 40 nmPV or less.

In the conventional grinding operations, it is necessary to make a diameter of the grindstone to be as thin as 1 mm for processing the aforesaid form, and therefore, the number of grindstone particles which contribute to the processing is extremely reduced, thus, tool abrasion is accelerated remarkably, and a thin grindstone and a grindstone shaft are easily bent by grinding resistance. As a result, an amount of removal by grinding is not stabilized, and a highly precise processing for the transfer optical surface cannot be realized. To verify the foregoing, the inventors of the invention made comparative tests as follows.

Figure 14:
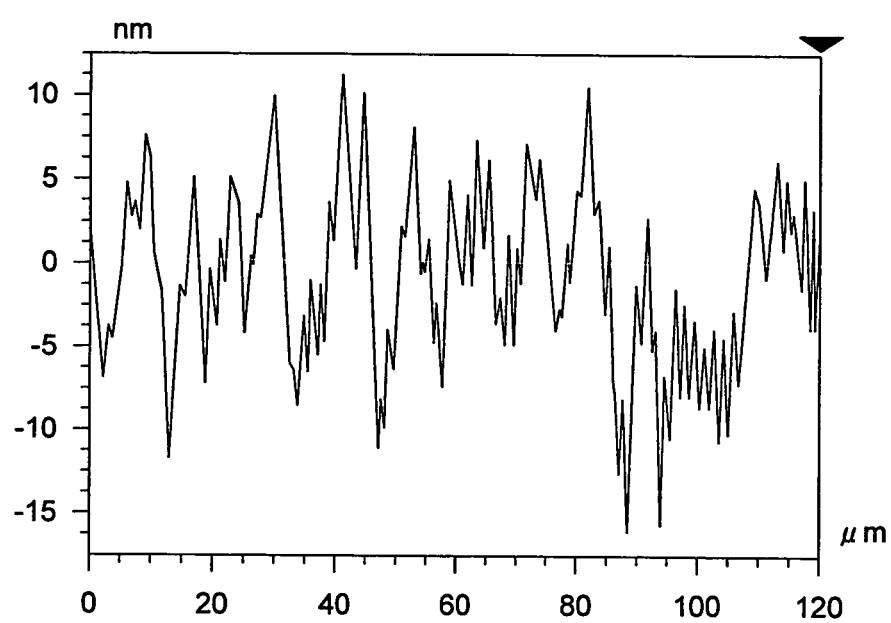
FIG. 14 is a diagram representing the result of measuring the roughness of the cut surfaces in the conventional technique.
Figure 15:
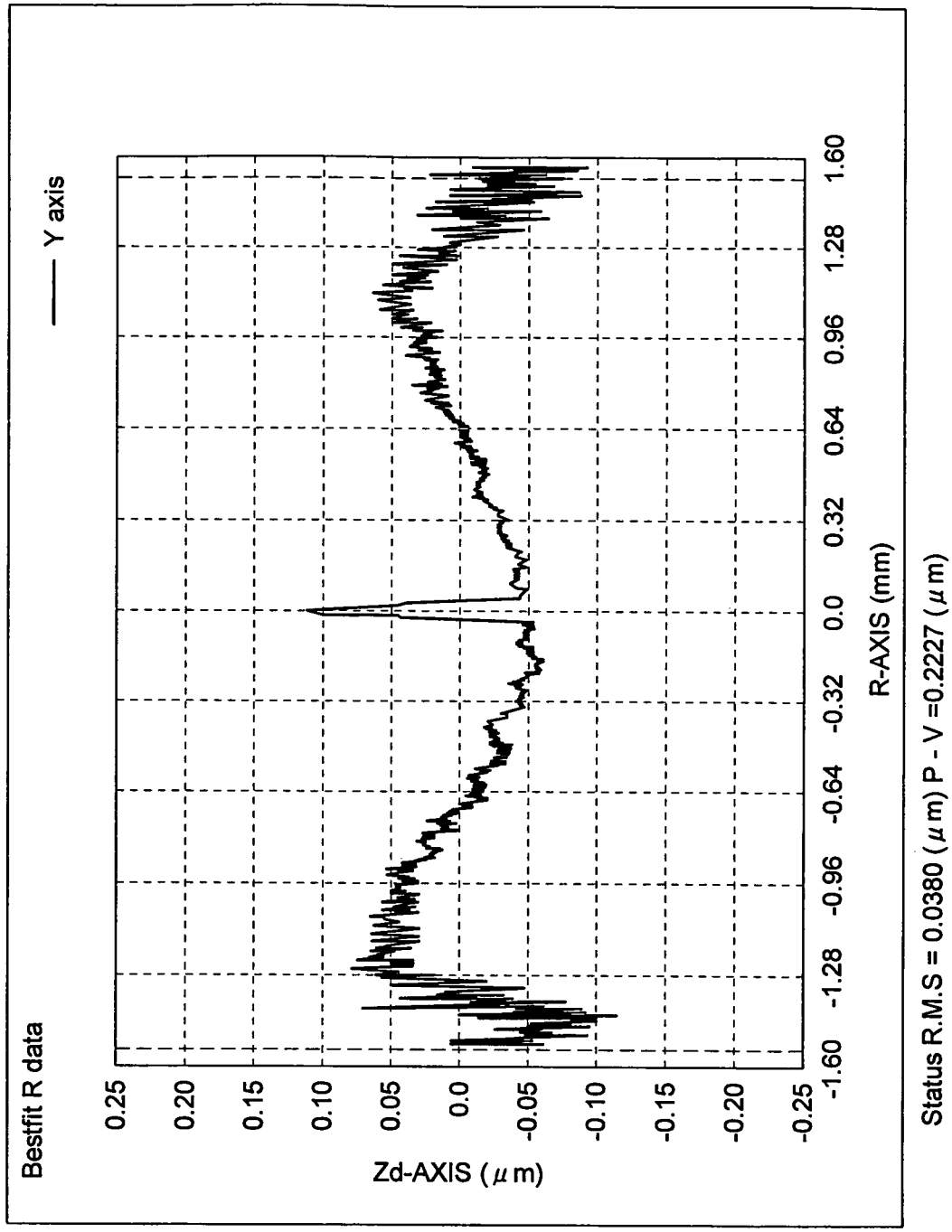
FIG. 15 is a diagram representing the result of measuring a contour error.

Under the condition of rough grinding precision of 1 μm or less, the same transfer optical surface form of the same material was actually subjected to finishing operation through conventional grinding operations. Results of the measurement conducted by the same measuring instrument are shown in FIG. 14. As is clear from FIG. 14, the mean surface roughness Ra was 4.19 nm, and an error of the transfer optical surface form was about 100 nmPV. On the other hand, FIG. 15 shows the results of the measurement on the same measuring instrument about a precision of the processed form by correcting processing. As is clear from FIG. 15, grindstone abrasion was accelerated remarkably in the grinding operations, and an error in the form was 100 nmPV finally at the best even when the central portion was eliminated. Though the processed surface roughness seems as if it can be used as a transfer optical surface in terms of a numerical value, the processed surface cannot be used as a transfer optical surface without taking any actions, because many deep scratch-shaped grooves exist, and these grooves cannot be measured to the bottoms in measurement principles. Therefore, post processing such as grinding operation was judged to be necessary.

In the cutting operations relating to the invention, the second transfer optical surface was subjected to cutting operations by using the tool used for the first transfer optical surface processing and NC program including form correction, and the surface roughness which is substantially the same as the first transfer optical surface precision and the form precision were obtained, and excellent reproducibility for processing was confirmed.

In the foregoing, one diamond tool lasted to do cutting operations for five transfer optical surfaces, and mean surface roughness was 3 nm or less for all of the five transfer optical surfaces, and it was possible to create an aspheric surface transfer optical surface having a form error of 50 nm or less. The point of a blade of the diamond tool after cutting operations was observed under SEM (scanning type electron microscope), and it was confirmed that no chipping was caused at all, although tool abrasion of about 3 μm in width was observed on a flank.

Figure 16:
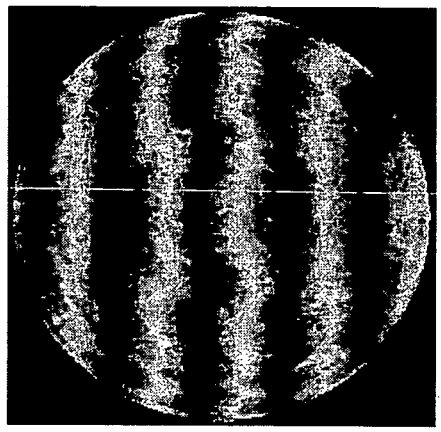
FIG. 16 is a diagram representing the results of observing a glass optical device produced by using the optical device producing mold made of the material of high hardness finished to a high precision through the steps of cutting (a) and grinding (b) of the present invention, wherein an interferometer is used for observation.
Figure 16:
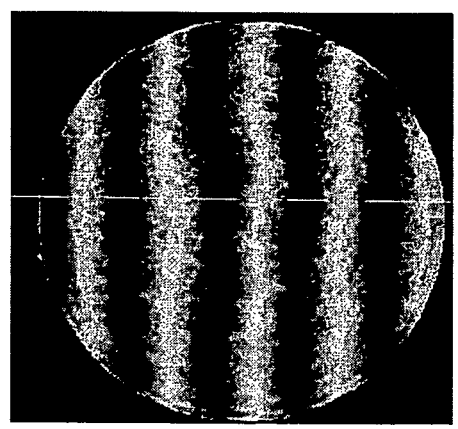

Performances of the glass optical element made through hot press molding by using a molding die for an optical element as it is were measured by an interferometer whose semiconductor laser wavelength is 405 nm. FIG. 16 shows results of the observation by an interferometer for the glass optical element molded by the use of the optical element molding die made of highly hard material which was finished through the cutting operation (a) of the invention and through grinding operation (b). As is apparent from FIG. 16, it was possible to obtain a highly accurate optical element having RMS30 mλ in terms of transmitted wavefront aberration.

Next, for the purpose of improving transmittance of the highly accurate optical element thus obtained, and of restraining the ghost caused by reflected light, a 5-layer antireflection coating was provided on each of both surfaces of the molded optical element, which resulted in the transmittance of 98% or more. The reason for the foregoing is that the surface roughness of the transfer optical surface of an optical element molding die resulting from the cutting operation of the invention is extremely excellent and is free from swells or scratches which cause scattering, even when an additional operation such as grinding is not carried out. In particular, it was proved that Rayleigh scattering which is supposed to increase inversely to the fourth power of a working wavelength of the light source is restrained to be low sufficiently even in the case of light having a short wavelength such as 405 nm.

Further, separately from the highly accurate glass optical element obtained through molding by the molding die that is made by the aforesaid cutting operation of the invention, decentering was adjusted by combining a diffraction optical element for correction of chromatic aberration obtained through plastic molding, thus, it was possible to obtain a highly accurate and workable optical unit that is compatible for plural wavelengths and has excellent performance even when light of the light source has a wavelength of 405 nm and a wavelength of 650 nm. The optical unit of this kind can be used preferably for an optical pickup device capable of conducting recording and/or reproducing of information for an optical disc such as BD or HD DVD.

It was possible to secure the high stability for performance for temperature changes, and it was possible to restrain an amount of fluctuations of performance to be a half or less of that in an occasion of plastic lens alone.

Figure 8:
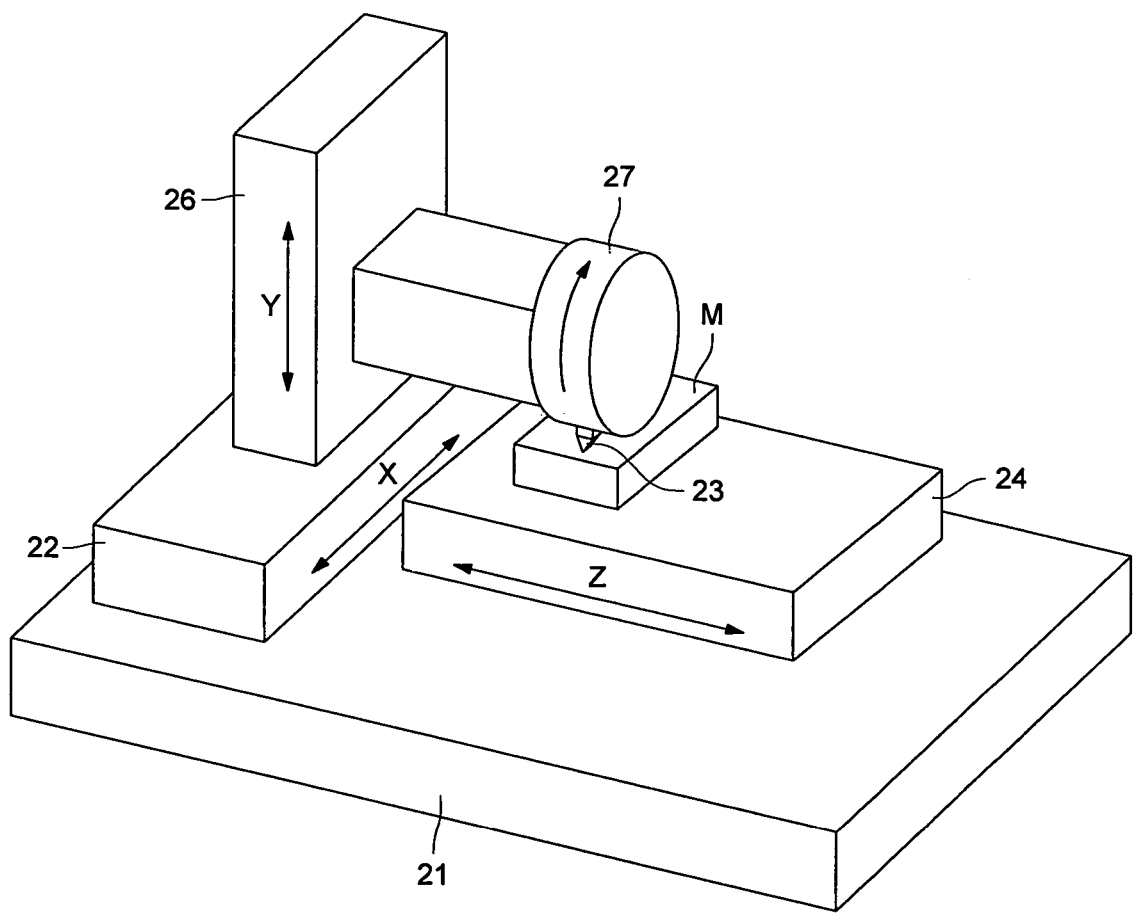
FIG. 8 is a perspective view of a super-precision machine in an embodiment of the present invention.

FIG. 8 is a perspective view of a superfine processing machine in another embodiment which has therein an orthogonal, triaxial and movable stage and a rotating mechanism that rotates a diamond tool. In FIG. 8, X-axis table 22 that is driven in the X-axis direction and Z-axis table 24 that is driven in the Z-axis direction are mounted on machine platen 21. On the X-axis table 22, there is fixed Y-axis stage 26 that is driven in the Y-axis direction, and rotating mechanism 27 that rotates diamond tool 23 is fixed on the Y-axis stage 26. Its axis of rotation is in parallel with Z-axis. Further, workpiece M is clamped on the Z-axis table 24. A method of cutting operation employing the superfine processing machine shown in FIG. 8 is a method wherein a transfer optical surface is created with an enveloping surface of a tool locus, when repeating actions to feed workpiece M slightly in the Z-axis direction by the Z-axis table 24 after cutting by feeding in the X-axis direction by the X-axis table 22, while rotating the diamond tool 23 at high speed, and it is one called generally a fly cutting method. This method is advantageous for cutting operations for a long and slender transfer optical surface, because the cutting speed of the diamond tool 23 can be enhanced by the rotation, and high speed processing can be conducted with less load on the point of a blade even when feeding in the X-axis direction is increased.

EXAMPLE 2

The inventors of the invention conducted cutting operations by using the superfine processing machine shown in FIG. 8. Microalloy F (Vickers hardness Hv=1850) manufactured by Tungaloy Corporation was used as a material of a workpiece. With respect to a processed form to become a transfer optical surface, its cross-sectional form is in a form of an aspheric surface, and in the direction perpendicular to the processed form, it is in a cylindrical aspheric surface having no curvature (cross-sectional form in the Z-axis direction: approximate R concave of 3.2 mm, central radius of curvature of 5.4 mm, width of 0.9 mm, form in the X-axis direction: radius of curvature ∞ (infinite) and length of 15 mm).

In the same way as in Example 1, a transfer optical surface was processed by electrical discharge machining, and was machined roughly by a general purpose precision grinding machine. Finishing cutting operations of the invention was conducted by the superfine processing machine shown in FIG. 8 for the transfer optical surface form subjected to machining roughly. A diamond tool used in this case was an R-cutter having a rake face arc radius of a cutting edge is 0.8 mm, an angle of flank is 5° and an angle formed by a rake face and a flank at a cutting edge point is 110°.

Processing conditions include the number of rotations of the tool of 4000 r.p.m., a depth of cut of 0.5 μm and the feed rate in the X-axis direction of 200 mm/min. Feeding in the Z-axis direction is of a regular pitch, and the feeding may be 1 μm to make mean surface roughness Ra to be about 2 nm, but if the total amount of depth of cut is made to be several nm, about 4000 back-and-forth motions are needed, resulting in processing time of about 13 hours, which means poor efficiency. Therefore, the process of work was designed under the condition that extremely light grinding operation for removing a cutter mark is conducted after processing, and a pitch of feeding in the Z-axis direction was made to be 5 μm.

Figure 17:
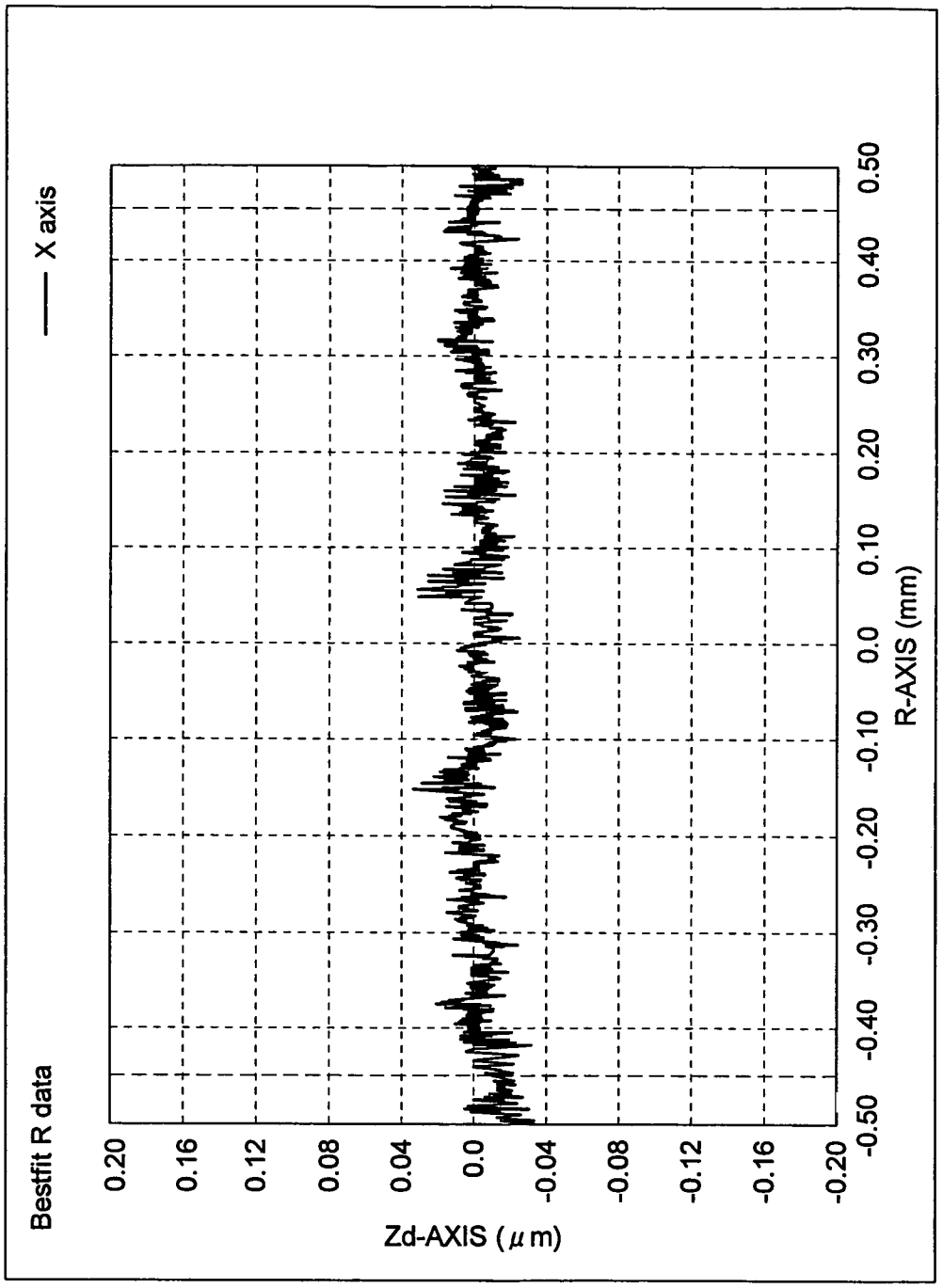
FIG. 17 is a diagram representing the result of measuring the contour precision after cutting the transfer optical surface (prior to polishing)
Figure 18:
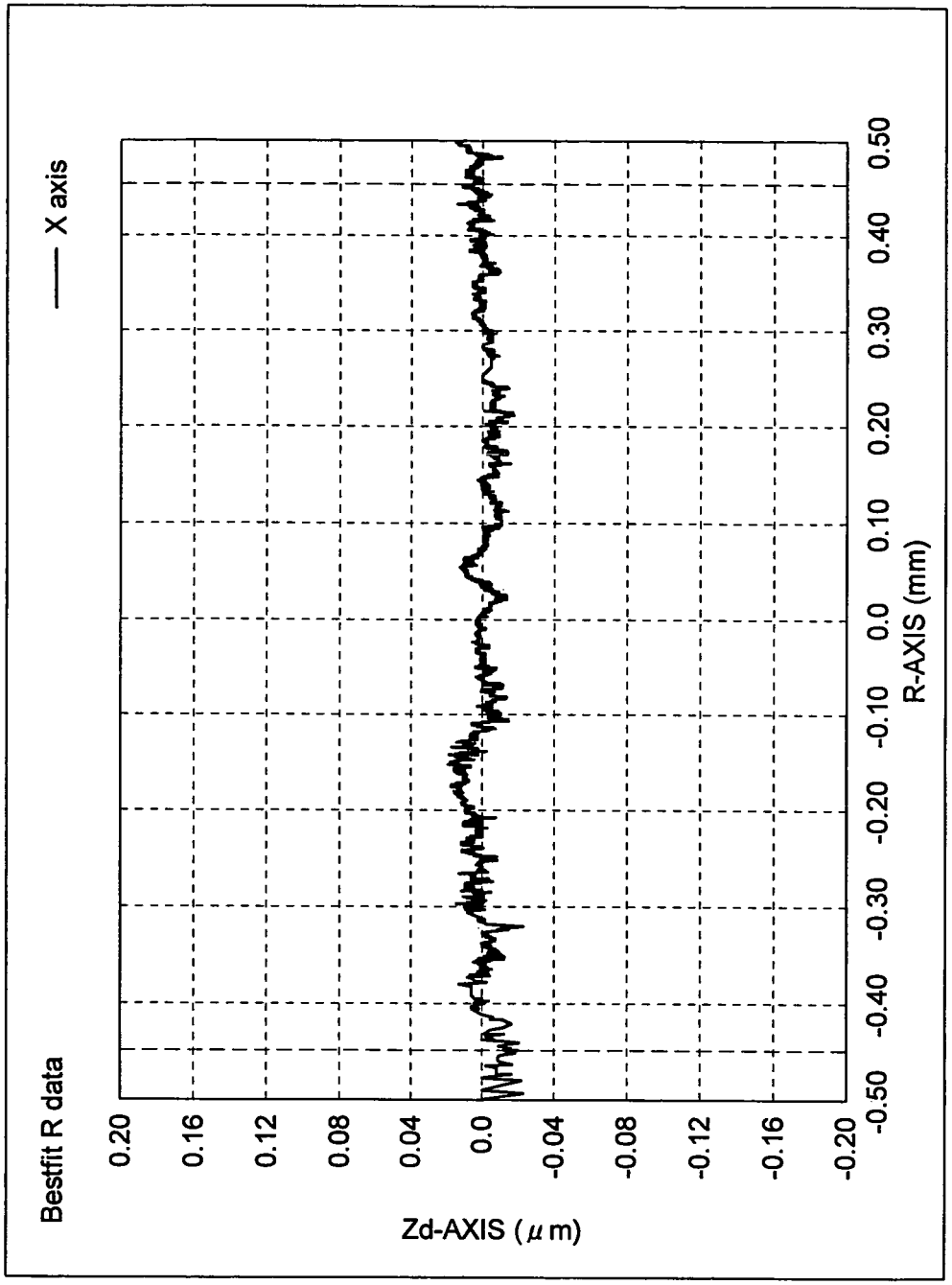
FIG. 18 is a diagram representing the result of measuring the contour precision after cutting the transfer optical surface (subsequent to polishing)

As a result of cutting operation, results of the measurement of a precision of a form for cutting operations of a transfer optical surface are shown in FIG. 17. As is apparent from FIG. 17, swells of an extremely short cycle are those appeared from cutter marks caused by feeding pitches in the Z direction, and an error of processed form at this point of time was 63 nmPV. After conducting grinding operations further for about 10 minutes on the entire optical surface to be cut, under the conditions of the same pressure and processing time, components of an extremely short cycle were removed as shown in FIG. 18, resulting in an error of processed form of 42 nmPV.

Simultaneously, means surface roughness Ra was improved from 9.5 nm to 3.1 nm. Though it looks seemingly that an error of a form of the transfer optical surface has been reduced to about two-thirds by the grinding operation representing an additional operation, the truth is that the cutter marks were just removed uniformly, and high accuracy for the form resulting from original cutting operations appeared, because the grinding operation has no form creating ability at all. As in the foregoing, it was cleared that an entire transfer optical surface can be ground by the cutting operation of the invention in a short period of time without any deformation.

The reasons for the foregoing are as follows; since the surface subjected to cutting operations has uniform and regular cutter marks on an entire transfer optical surface as is observed on a photograph for observation, the cutter marks can be removed easily and almost simultaneously for the entire surface, by conducting grinding under the uniform condition for the entire transfer optical surface, and since the cutter marks are in a short cycle and have a directivity, it is possible to remove only cutter marks easily, effectively and selectively by conducting grinding in the direction perpendicular to the direction of the cutter marks in its directivity. By combining this grinding operations, it has become possible to realize a processed form that is in higher precision than that by conventional grinding and polishing and a sufficient mirror surface in a period of time that is one fifth of the conventional time, by combining the cutting operation of the invention and polishing operation. The processing time including the cutting operations and uniform grinding was 4 hours.

Figure 19:
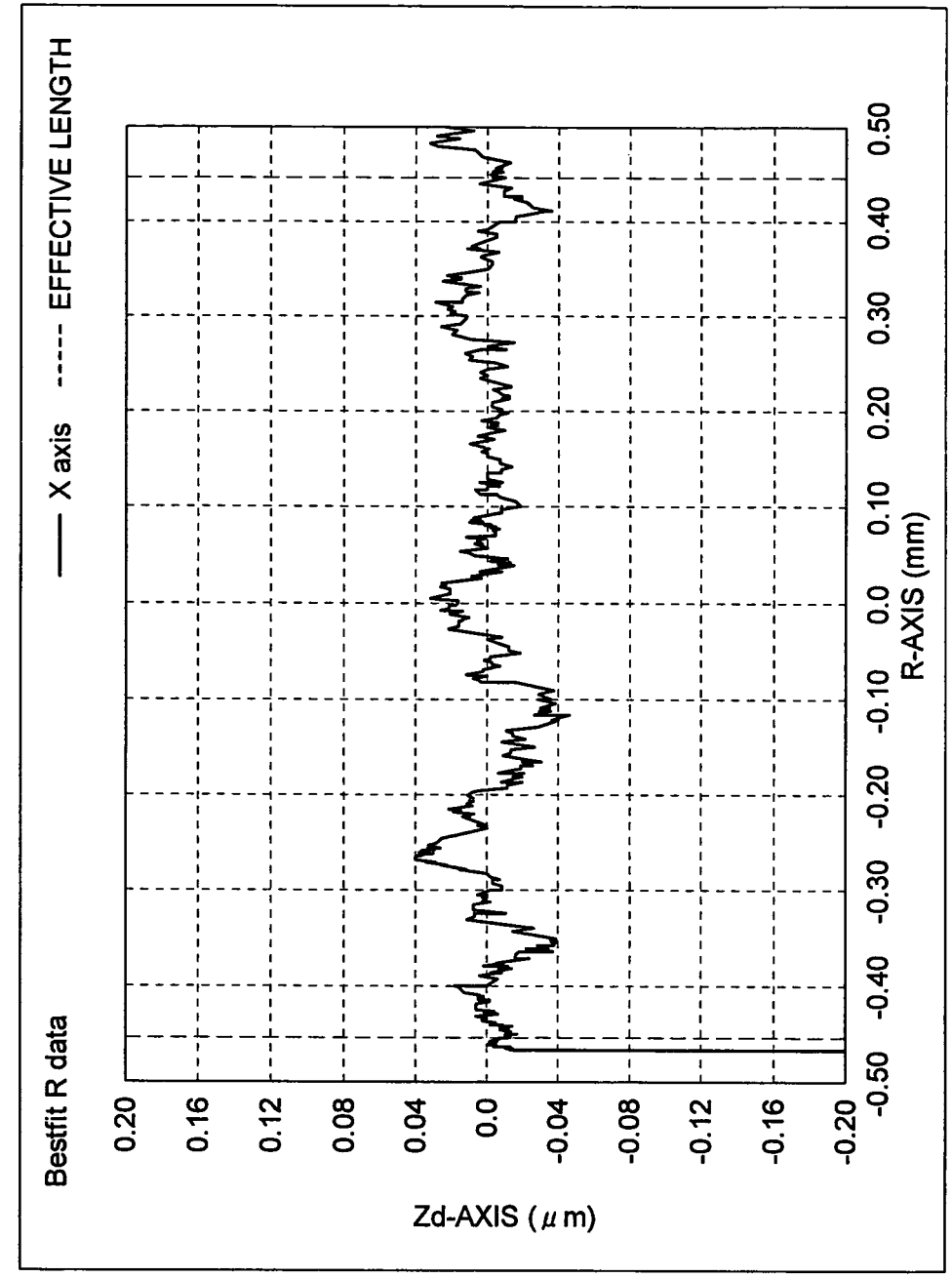
FIG. 19 is a diagram representing the result of measuring the contour precision after cutting according to the conventional grinding method.

Results of the measurement of precisions for the processed form by the conventional grinding method are shown in FIG. 19. FIG. 19 shows big swells having a short cycle caused by a precision of a form of a grindstone representing a grinding tool and by an influence of abrasion of the tool. Time for grinding operations was 14 hours as a result of processing after making corrections four times. Further, deep and processing-caused scratches which are caused randomly by grinding made the grinding operation time to be 6 hours, and an error of the processed form was 80 mmPv, and 50 nmPV that is a required form precision was not satisfied.

FIG. 20 (a) shows results wherein a glass optical element molded by the use of the optical element molding die made of highly hard material which was finished through the grinding operation after the cutting operation of the invention was observed by an interferometer. As is shown in FIG. 20 (a), it was possible to obtain a highly accurate optical element having transmitted wavefront aberration RMS18mλ at light source wavelength 405 nm. In contrast to this, FIG. 20 (b) shows results wherein a glass optical element molded by the use of the optical element molding die made of highly hard material which was finished through the grinding operation after the conventional grinding operations, was observed by the interferometer. In the glass optical element made by conventional grinding operations and polishing operations, wavefront aberration is as bad as RMS32mλ as shown in FIG. 20 (b), and as is apparent from the drawing, innumerable processing marks by grinding are observed on interference fringes even after grinding operations, and it was found that an influence of scratches caused by grindstone particles remains in the extremely deep area despite the highly hard material.

FIG. 9 is a perspective view of a superfine processing machine relating to another embodiment. In FIG. 9, X-axis table 2 that is driven in the X-axis direction by an unillustrated control device is arranged on machine platen 1. On the X-axis table 2, there is mounted diamond tool 3 through tool fixing section 7. Further, Z-axis table 4 that is driven in the Z-axis direction by an unillustrated control device is arranged on machine platen 1. On the Z-axis table 4, there are mounted rotation drive mechanism 6 controlled by an unillustrated control device and spindle (rotating shaft) 5 that is driven to rotate by a rotation drive mechanism. A material for a molding die for an optical element having a transfer optical surface to be processed (which is also called a workpiece) can be clamped on spindle 5.

In the method of processing a transfer optical surface relating to the present embodiment of the invention, stiffness for each of spindle 5 and of X-axis and Z-axis tables 2 and 4 is extremely high, a superfine processing machine having axis-control resolution of 100 nm or less is used, then, a die for molding an optical element representing a workpiece clamped on spindle 5, and when cutting operations are conducted in a ductile mode by diamond tool 3, while moving a point of cutting of the cutting edge continuously in the course of processing, a transfer optical surface having a curvature such as an aspheric surface form can be created.

EXAMPLE 3

The inventors of the invention conducted cutting operations of the invention by using the superfine processing machine of a biaxial type with X axis and Z axis shown in FIG. 9. As a material of a workpiece, SiC subjected to powder sintering was made to be a base material, and SiC was applied to a portion that is to be a transfer optical surface by CVD (which is called CVD-SiC film) to create an elaborate transfer optical surface. The hardness of CVD-SiC used this time was Vickers hardness Hv2800.

As a method of processing a transfer optical surface, grinding operations are conducted by a general purpose precision grinding machine at a form error of about 100 μmPV to a form of aspheric surface wherein a film thickness of CVD-SiC is considered. After that, CVD-SiC is coated to a thickness of about 500 μm. After coating, the transfer optical surface form is created by the general purpose precision grinding machine, while conducting correcting processing for the final aspheric surface at a form error of 1 μmPV or less. The final aspheric surface form is a relatively gentle concave transfer optical surface having a central radius of curvature of 3.5 mm, an angle of maximum likelihood of 35° and a transfer optical surface diameter of 3.2 mm.

Next, the aspheric surface transfer optical surface processed roughly was subjected to finishing cutting operations conducted by a biaxial superfine processing machine shown in FIG. 9. Processing conditions included the number of rotations of the spindle of 340 r.p.m., a depth of cut of 100 nm and the feed rate of 0.1 mm/min. The tool used was an R-cutter employing monocrystal diamond cutter wherein rake face arc radius of the point of a blade of the tool is 1.0 mm and an angle formed by the rake face and the flank is 100° at a cutting edge point. Further, the diamond tool was set on the processing machine so that a face angle may be −25°.

CVD-SiC was processed by the cutting operation method of the invention to be in an aspheric surface form, and its surface roughness was measured by the use of the surface roughness tester HD 3300 made by WYKO Co. As a result, a mirror surface having the surface roughness of Ra 3.44 nm was obtained. A precision of a processed form was 80 nmPV which was not so good for the small angle of maximum likelihood.

An amount of abrasion on the flank of the point of a blade of the diamond tool 3 was 1.7 μm in terms of a width of the ridge on the point of a blade. The material was harder than the ultra hard one, and an amount of abrasion on the point of a blade was relatively small. The reason for this is considered as follows; the arc radius of the point of a blade was as large as 1.0 mm, and cutting operations are advanced by using a long ridge of a cutting edge, thus, a load to shave away CVD-SiC on the point of a blade was dispersed. Chipping on the point of a blade was not caused at all, resulting in the condition where a plurality of CVD-SiC transfer optical surfaces can further be subjected to cutting operations.

As is shown by the results, even in the case of CVD-SiC which is an extremely hard material, a mirror surface can be obtained by the invention, and it was cleared that ductile mode cutting which is ideal can be realized.

EXAMPLE 4

As Example 4, the cutting operations were conducted by using the biaxial superfine processing machine shown in FIG. 9, in the same way as in Example 3. As a material of a workpiece, Microalloy F (Vickers hardness Hv1850) made by Tungaloy Corporation was used. A form of the transfer optical surface is one having a blaze-shaped diffractive groove, and an amount of blazed step in the optical design is 1.15 μm.

As a tool, there was used a semilunar tool wherein a vertical angle is 30°, an arc radius connected from a tip of the point of a blade is 0.6 μm, and an angle (connection angle) formed by a line segment connecting between a point where a linear ridge is connected with an arc and the linear ridge extending to the point of a blade is 60°. The tool was set on the processing machine to be inclined to the front side by about 15° so that an angle of the rake face may be −15° at a cutting edge point, though a face angle of the tool itself on the fitting surface is 0°. The number of rotations of the spindle was 500 r.p.m., a depth of cut was 100 nm and the feed rate was 0.1 mm/min.

As a result of cutting operations conducted under the aforesaid conditions, it was possible to process without damaging the point of a blade of the diamond tool, and when an amount of a blazed step was measured by surface roughness tester HD 3300 made by WYKO Co., it was 1.1 μm. In the past, processing was conducted in a way Where an angle of the rake face at a cutting edge point was 0°, in which the point of a blade of the diamond tool was damaged and it was not possible to process up to the targeted blazed step at all. Further, in the grinding operations which have been conducted in the past, the radius of a tip portion of a grindstone formed by truing was about 5 μm at the best, and therefore, an arc form of the tip portion of the grindstone was transferred onto a bottom portion of a blaze, which prevented the processing with fidelity to the designed form.

It was cleared that a highly precise microscopic form can be processed by the cutting method of the invention without damaging the point of a blade of the diamond tool, by converting resisting force against cutting which is applied on the point of a blade of the diamond tool and acts in the direction to snap the point of a blade into compression stress to ease the resisting force against cutting, even for the highly hard material for which the conventional grinding processing does not work to form a designed form due to the restriction of a form of a grindstone and the conventional cutting operation does not work to process a diffractive groove form at all because its point of a blade snaps easily.

Figure 7:
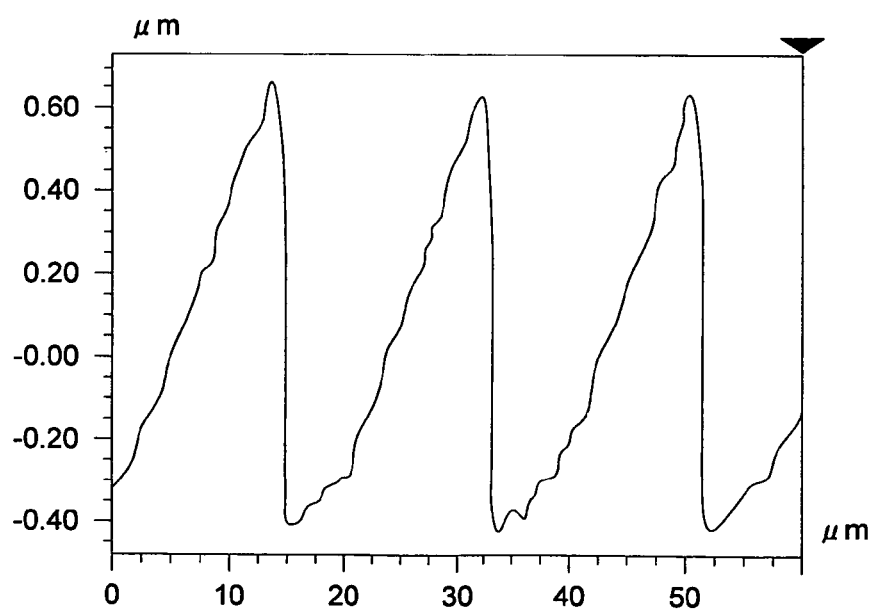
FIG. 7 is a diagram representing an example of the rake face of a blazed tool tip.

Hot glass molding was carried out by using a molding die for a blaze diffraction optical element made of the highly hard material to realize blaze diffraction GM optical element, whereby, there was obtained a high performance glass optical element which has less fluctuation of aberration caused by temperature changes and is capable of being corrected in terms of chromatic aberration. FIG. 7 shows results of the measurement of blazed forms.

Figure 22:
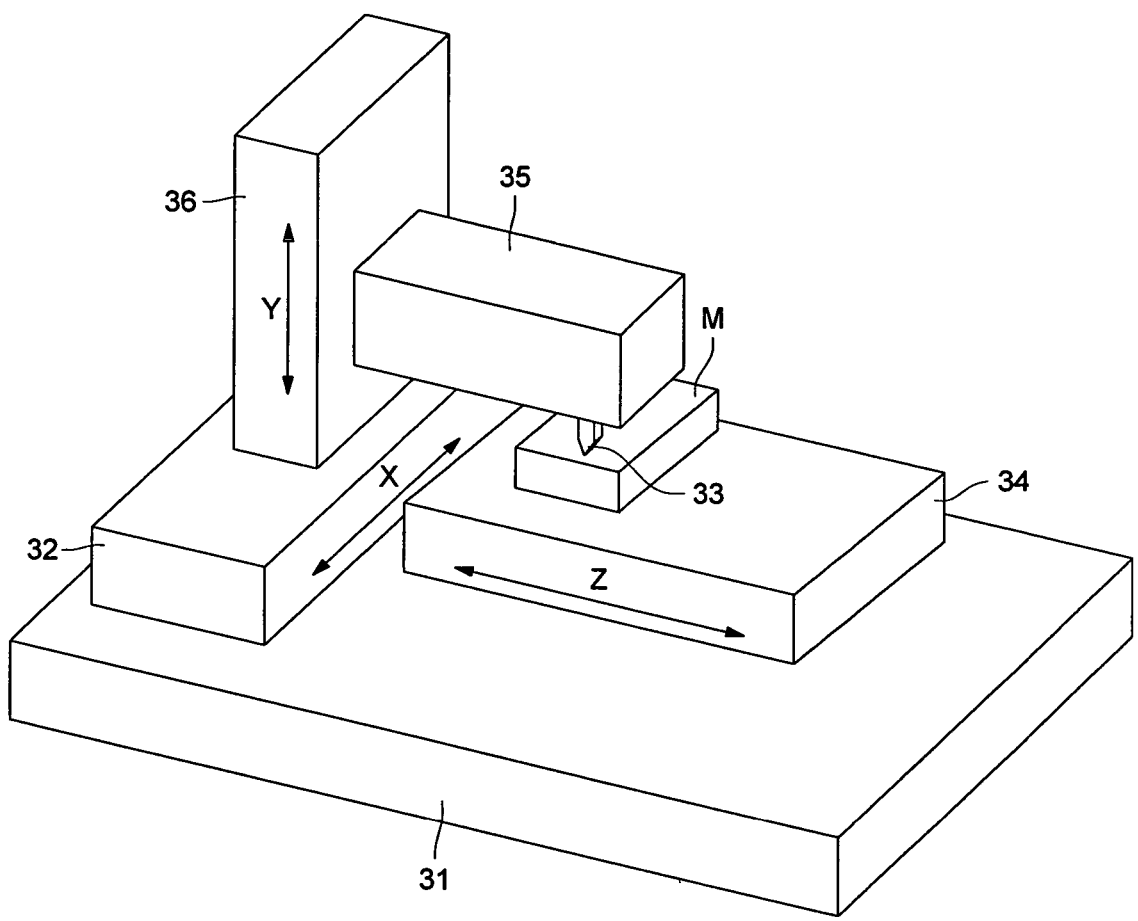
FIG. 22 is a perspective view of a super-precision machine in an embodiment of the present invention.

FIG. 22 is a perspective view of the superfine processing machine relating to another embodiment. In FIG. 22, X-axis table 32 that is driven in the X-axis direction and Z-axis table 34 that is driven in the Z-axis direction are mounted on machine platen 31. On the X-axis table 32, there is fixed Y-axis stage 36 that moves in the Y-axis direction, and on the Y-axis stage 36, there exists arm block 35 for protruding the diamond tool 33. The arm block 35 is of the mechanism in which the diamond tool 33 is fixed on the tip of the arm block 35. Workpiece M is clamped on the Z-axis stage 34.

EXAMPLE 5

As Example 5, graduating cutting operation was conducted on the superfine processing machine having an orthogonal, triaxial and movable stage shown in FIG. 22, by using a monocrystal diamond tool and a highly pure CBN tool as a tool for cutting the highly hard material.

A material to be used for forming a transfer optical surface is a plane of Microalloy F (Vickers hardness Hv1850, and a form for cutting operation is 10 mm in width×40 mm in length) made by Tungaloy Corporation. The monocrystal diamond tool and a highly pure CBN tool used are an R-cutter having the same form of the point of a blade. In the form of the tool, rake face arc radius of a cutting edge is 0.5 mm, an angle of flank is 2° and a face angle at a cutting edge point is 0° in an individual tool. Processing conditions include a depth of cut of 0.5 μm, the feed rate in the X-axis direction of 50 mm/min and feeding pitch in the Z-axis direction of 5 μm.

Figure 23:
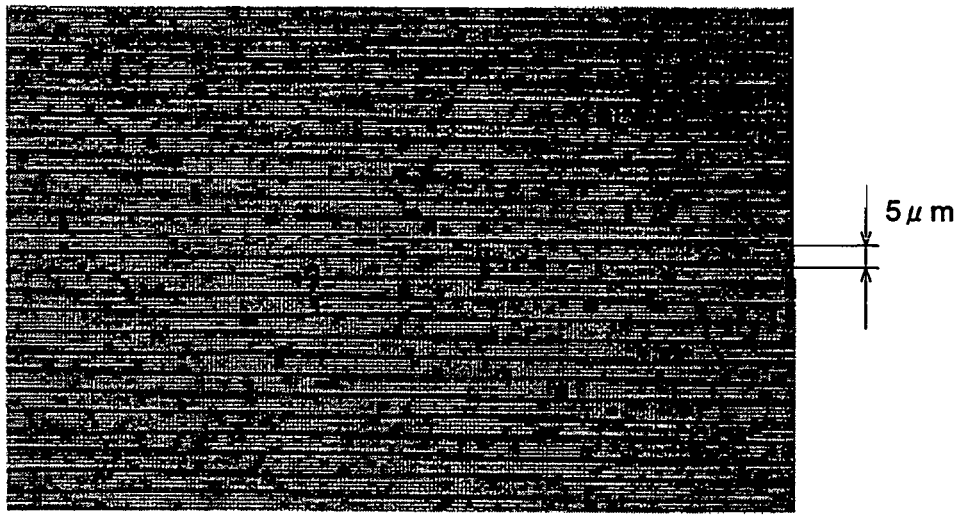
FIG. 23 is a stereoscopic photograph of the surface machined in the brittle cutting mode.
Figure 24:
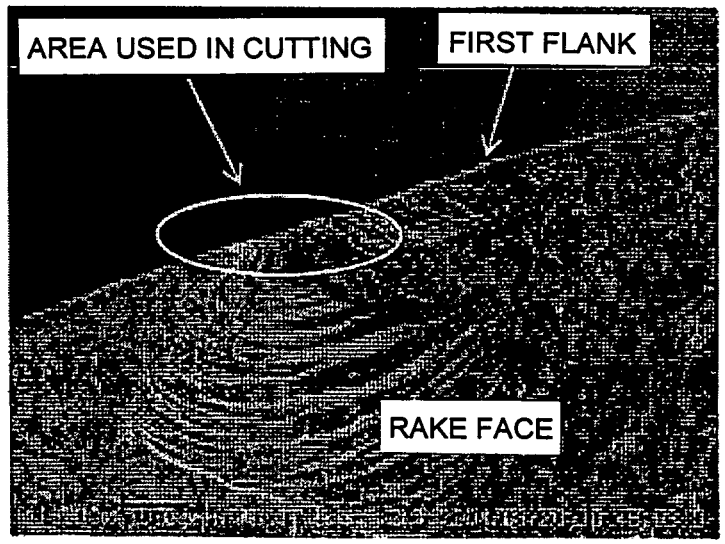
FIG. 24 is a stereoscopic photograph of the cutting tip machined in the brittle cutting mode.

First of all, the diamond tool was set on the aforesaid processing machine so that a face angle at the cutting edge point may be 0° as it is. With respect to the state of the processed surface, innumerable images appearing to be holes in size of not more than 3 μm are observed on the processed surface as is shown in FIG. 23 representing a photomicrograph, which is problematic as a mirror surface. This is considered to be a mark where a WC particle was caught by the point of a blade and fell out, because the processing was conducted under the condition that a highly hard WC particle cannot be cut. In this case, when the point of a blade was observed with SEM by removing the tool, microscopic Chipping was observed on the ridge of the point of a blade as is shown in FIG. 24: representing a photomicrograph, and there was cleared the state where the point of a blade failed to cut in a hard WC particle buried in cobalt serving as a binder.

Next, the highly pure CBN tool was set on the superfine processing machine shown in FIG. 22 so that a face angle at the cutting edge point may be 0°, and processing was conducted on the same material under the same condition as in the case of the diamond tool. As a result, the number of WC particles which fell out was relatively less, but there was scattering which was seen to be whitish slightly, which was insufficient as a transfer optical surface, if no action is taken. Since the highly pure CBN is a polycrystal material, the ridge on the point of a blade cannot become as sharp as that of the monocrystal diamond, thus, a mirror surface is considered to be obtained hardly. However, when the point of a bade was observed, no chipping was caused, and there was supposed an occurrence of the circumstances wherein toughness of the point of a blade of the highly pure CBN tool is higher than that of the point of a blade of the diamond tool, and even when the point of a blade thereof is hit by a WC particle, the WC particle cannot cut in the WC particle to slide on the surface of the point of a blade to be pushed in cobalt.

Figure 25:
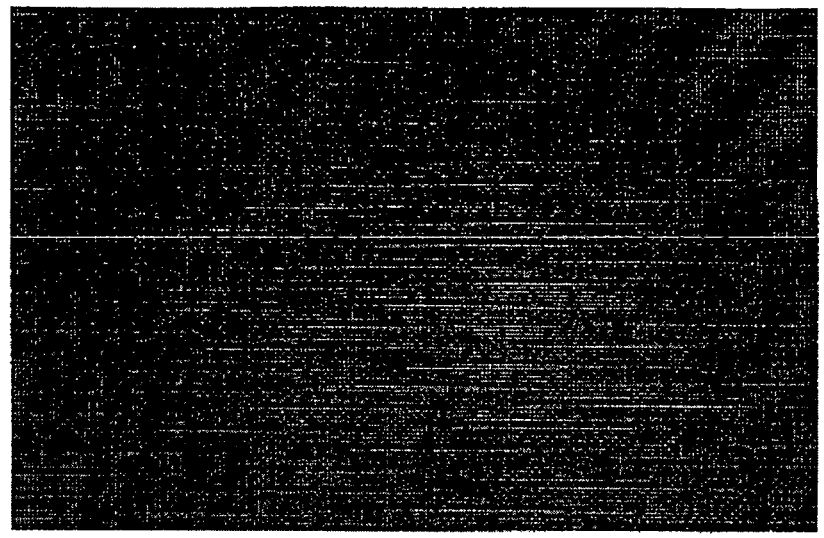
FIG. 25 is a stereoscopic photograph of the surface machined in the ductile cutting mode.

Further, cutting operations were conducted under the conditions of the same superfine processing machine, the same tool, the same material to be cut and the same transfer optical surface form, except for the face angle which was changed. First, the monocrystal diamond tool was set to be inclined to the front side on the processing machine so that an angle of the rake face at the cutting edge point may be −25°, and the cutting operations were conducted under the same condition as in the foregoing. As a result, WC particles did not fall out and a mirror surface was obtained concerning the state of the processed surface as shown in FIG. 25 representing a photomicrograph. Mean surface roughness Ra was 2.3 nm, proving that the processed surface can be used sufficiently as a transfer optical surface.

Figure 26:
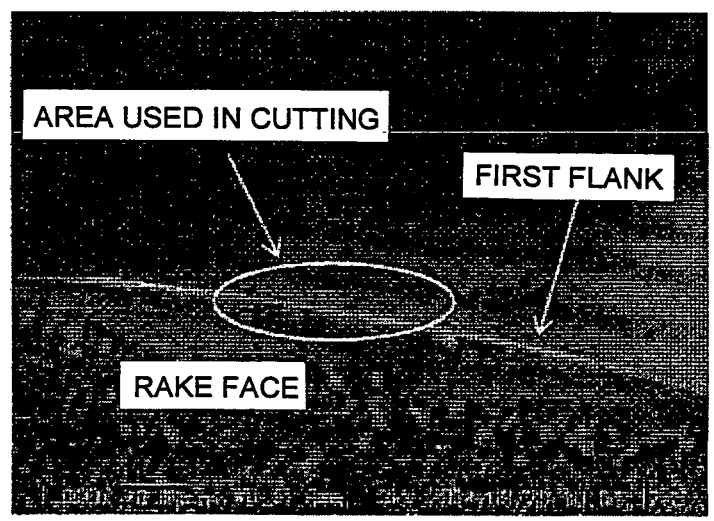
FIG. 26 is a stereoscopic photograph of the cutting tip machined in the brittle cutting mode.

On the point of a blade of the diamond tool in this case, no chipping was caused at all as shown in FIG. 26 representing a photomicrograph, and it was found that perfect ductile mode cutting can be realized in graduating cutting operations, simply by making the face angle to be negative.

Next, the highly pure CBN tool was set to be inclined to the front side on the aforesaid processing machine so that an angle of the rake face at the cutting edge point may be −25° in the same way, and the cutting operations were conducted under the same condition as in the foregoing.

As a result, WC particles did not fall out and holes on the surface disappeared, although scattering on the processed surface is still observed. When this was subjected to grinding operation conducted by a diamond slurry, by oscillating in the direction perpendicular to the direction of cutter marks, cutter marks was eliminated in about 12 minutes, and a transfer optical plane that is free from scattering and has mean surface roughness Ra of 3.5 nm was obtained. Therefore, it was found that a transfer optical surface having sufficient surface roughness can be obtained through graduating operations, by making the face angle at the cutting edge point to be negative even for the highly pure CBN tool, if the extremely simple grinding operation is used together. In particular, in the graduating operations, a load on the point of a blade is greater than that in the case of turning or fly cutting operation, and therefore, it was found that characteristics of the highly pure CBN tool that is more resistant to chipping and to breakage than the diamond tool may lead directly to a longer life of the tool, thus, the highly pure CBN tool is more suitable for conducting cutting operations efficiently for a large number of transfer optical surfaces, under the assumption of simple grinding operations.

Figure 27:
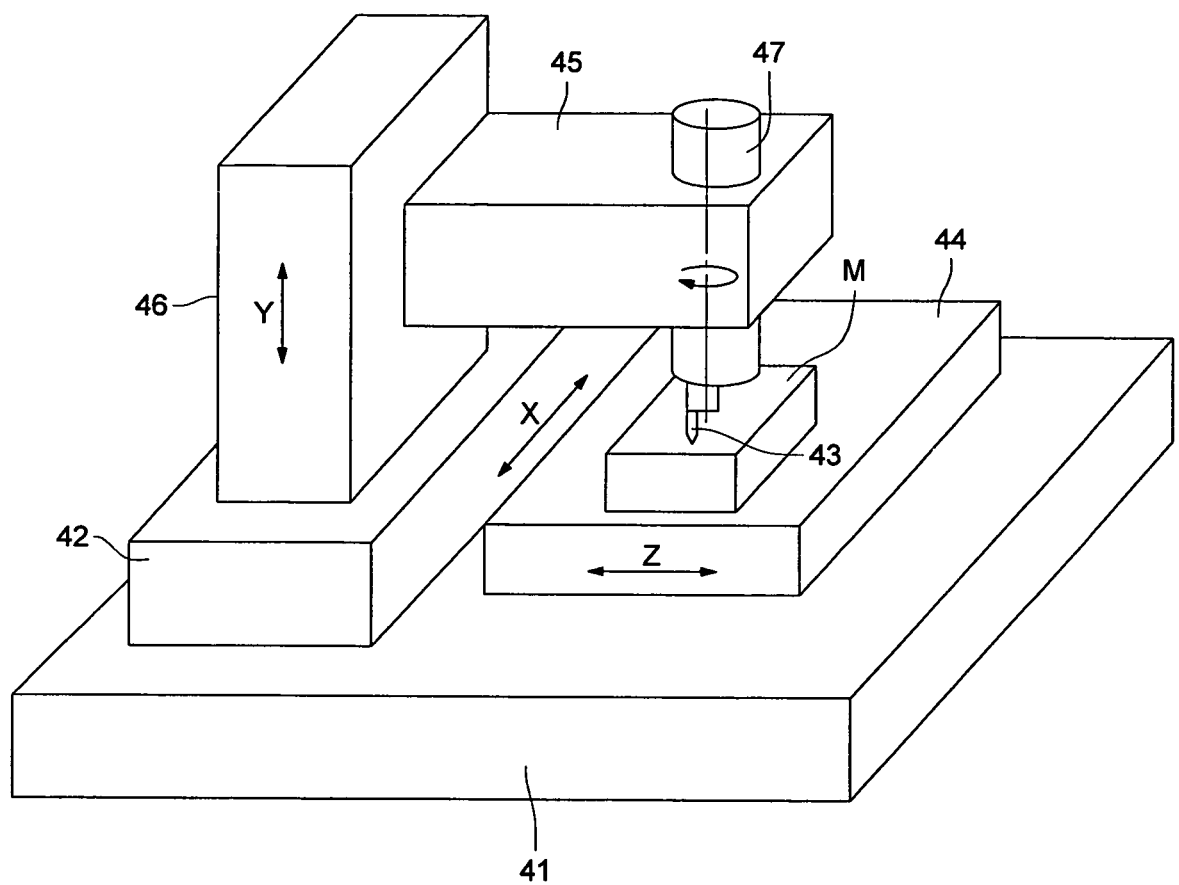
FIG. 27 is a perspective view of the super-precision machine in the embodiment of the present invention.

FIG. 27 is a perspective view of a superfine processing machine in another embodiment. In FIG. 27, X-axis stage 42 that is driven in the X-axis direction and Z-axis stage 44 that is driven in the Z-axis direction are mounted on machine platen 41. On the X-axis table 42, there is fixed Y-axis stage 46 that is driven in the Y-axis direction, and rotating mechanism 47 that rotates diamond tool 43 is connected to the Y-axis stage 46 by arm 45. On the end face of the rotating shaft of the rotating mechanism 47, there is fixed a tool so that its point of a blade comes to the position that is away from the center of rotation by 15 mm in the radial direction, and cutting operation is conducted by giving a depth of cut in the Y-axis direction for workpiece M fixed on the Z-axis stage 44 and by feeding the diamond tool 43 in the X-axis direction.

EXAMPLE 6

As Example 6, milling cutting operation was conducted for highly hard material, on the superfine processing machine having an orthogonal, triaxial and movable stage shown in FIG. 27, by using a diamond tool. A flat transfer optical surface was machined under the axis arrangement for cutting in a form of the circumference. The flat transfer optical surface is in a size of 20 mm in width and 50 mm in length, a material is CVD-SiC (Vickers hardness Hv 2800), and coating with thickness of 300 µm is provided on power sintering SiC representing a base material.

As rough processing, surface grinding employing a diamond grindstone of #2000 having a diameter of 250 mm was used to process to the flatness of not more than 1 µm. Processing conditions for ductile mode milling by a monocrystal diamond tool include a depth of cut of 0.3 µm, the number of rotations of the tool of 6000 r.p.m. and the feed rate of 100 mm/min.

The diamond tool used is a flat-ended tool, a width of a cutting edge on the rake face is 1.5 mm, angle formed by the rake face and a flank at the cutting edge point is 110° and an angle formed by a cutting edge direction and a rake face at the cutting edge point is −25°. Total depth of cut is a depth of about 1 µm because a cutting-in operation was conducted three times after the point of a blade touched the surface to be processed roughly. Accordingly, the time required for cutting operations is about 2 minutes.

With respect to the results of the processing, mean surface roughness Ra was 2.6 nm and flatness was 78 nmPV, which are sufficient results for practical use as a transfer optical surface.

The method of cutting operations of the invention has made it possible to create a transfer optical surface highly efficiently at high speed, for the extremely hard CVD-SiC in highly hard materials for which the cutting operation has not been considered, while making the most of the characteristics of the milling operations having a broad processing area wherein an area within a circle of a locus of a rotating tool is a processing area.

EXAMPLE 7

As Example 7, the cutting operations were conducted by using the superfine processing machine having two axes of X and Z stages shown in FIG. 9. In this case, an angle formed by a rake face at the cutting edge point was changed, and relationship with the processed surface roughness was investigated. As a material for the cutting operations, ultra-hard Microalloy F (Vickers hardness Hv=1850) manufactured by Tungaloy Corporation. was used.

A form of the processed transfer optical surface is a concave spherical form having a radius of 5 mm, and a depth of the transfer optical surface is 1.5 mm. A diamond tool is an R-cutter, rake face arc radius of a cutting edge is 1.5 mm and an angle of flank is 5°. With respect to setting of the diamond tool on the processing machine, processing tests were made by changing the setting position within a range of −5°- −70° in terms of an angle formed by a rake face at the cutting edge point.

In the processing conditions, the number of rotations of the spindle on which a workpiece was clamped is 340 r.p.m., the feed rate is 0.2 mm/min. and a depth of cut per one time is 0.2 µm. Processing was conducted four times for on processing condition, and reproducibility was also confirmed. In this case, the relationship between an angle (face angle θ: see FIG. 1) formed by a rake face at a cutting edge point and a roughness on the processed surface was obtained. Its result is shown in FIG. 28.

Figure 28:
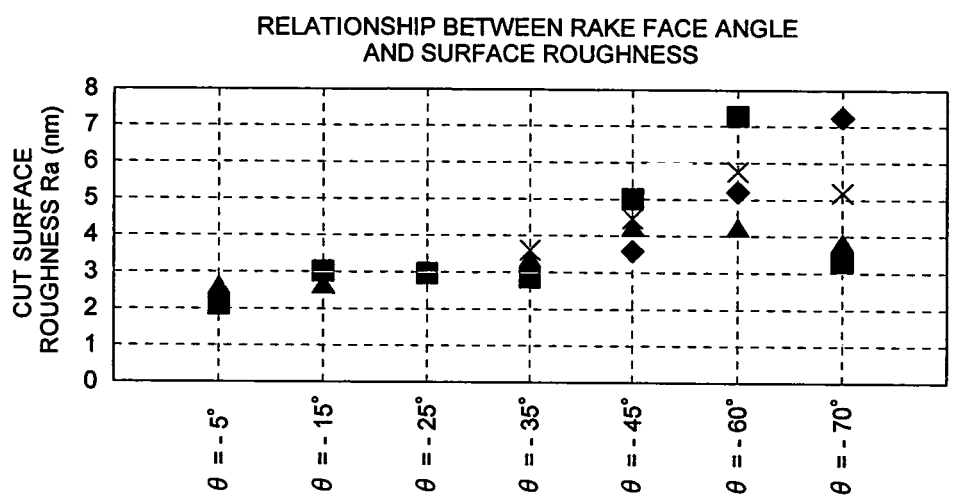
FIG. 28 is a diagram representing the relationship with the roughness of a machined surface.

As is apparent from FIG. 28, a large face angle makes the processed surface to tend to be rough. However, the face angle −60° makes the surface roughness Ra to be about 5 nm which is a peak, and thereafter, the surface tends to be smooth on the contrary. The reason for this can be supposed as follows; even when a depth of cut is given, a component of a force of cutting resistance that repels each other between a tool and a workpiece grows greater, and a given depth of cut does not work actually because of the small coefficient of friction between a diamond tool and a highly hard material, resulting in a slide of the diamond tool on the surface of the workpiece. When the processed surface was observed actually, cutter marks were not observed, and it was found that cutting operations were not carried out. These results indicate that, even when a precision of controlling the superfine processing machine is high, it is very difficult to give a desired depth of cut if the face angle is −60° or more, and it is also difficult to keep the depth of cut to be constant, resulting in deterioration of a precision of the processed form. Incidentally, the overall static rigidity between the tool and the spindle on the superfine processing machine used in the present investigation is 130 N/µm which is rather high as a processing machine on the market.

Further, under the condition of the face angle of −5°, microscopic chipping was observed on the point of a blade of the diamond tool for two times of processing out of four times of processing, and it was found that the negative face angle of this level has less effect of restraining chipping.

In the surface roughness in the case of cutting operations, it was found that the face angle at the cutting edge point of the point of a blade of the tool which is −25° or less is excellent, because it made the surface roughness Ra to be 3 nm or less. If an effect to restrain occurrence of chipping on the point of a blade of the tool is taken into consideration, a range of −15°-45° seems to be suitable to create a highly precise transfer optical surface on a highly hard material efficiently, even from the results in FIG. 28. In other words, if the face angle is smaller than this, the probability of occurrence of chipping is increased, resulting in a decline of processing productivity, while, if the angle is the same as or larger than this, it is difficult to maintain stable cutting situations, though it depends also on characteristics of the processing machine, and a precision of a form of the transfer optical surface and the surface roughness are deteriorated.

Therefore, in the case of the face angle ranging from −5° to −60°, an effect of the invention can be obtained sufficiently for the molding die for a micro-lens and a lens for a camera which require a level of a precision of processed form of 100 nmPV and surface roughness Ra of 5 nm as required accuracy. In the case of the molding die for ultrahigh precision optical element such as, for example, a lens used for a pickup device for Blu-ray requiring a processed form precision of 50 nmPV or less and surface roughness Ra of 3 nm or less, it is preferable to conduct processing under the face angle θ ranging from −15° to −45° which makes it possible to obtain the effect of the invention most.

EXAMPLE 8

As Example 8, the processing method of the invention was practiced by using the superfine processing machine having a rotating shaft shown in FIG. 11. In the Example 8, the relationship between the crystal orientation of a monocrystal diamond, chipping on the point of a blade of the tool and abrasion of the tool was investigated. As a material of a workpiece, ultra-hard Microalloy F (Vickers hardness Hv 1850) manufactured by Tungaloy Corporation. was used. A form of the processed transfer optical surface is a concave spherical form having a radius of 5 mm, and a depth of the transfer optical surface is 1.5 mm.

A diamond tool is an R-cutter, rake face arc radius of a cutting edge is 0.5 mm and an angle of flank is 5°. The diamond tool was set on the processing machine so that an angle formed by the rake face at a cutting edge point may be −25°.

In the processing conditions, the number of rotations of the spindle on which a workpiece was clamped is 340 r.p.m., the feed rate is 0.2 mm/min., a depth of cut per one time is 0.2 µm and a cutting length is 4 km.

With the crystal orientation of the diamond tool used this time, the smaller its numerical value is, the less an amount of abrasion is, as shown in FIG. 2. Therefore, three crystal orientation which are expected to cause less abrasion and a crystal orientation which is used ordinarily were used for the processing. Namely, the crystal directions were selected for manufacturing so that the cutting-in direction may agree with <110> direction of the crystal face (100) for the first diamond tool, and the cutting-in direction may agree with <110> direction of the crystal face (110) for the second diamond tool. For the third diamond tool, manufacturing was carried out so that the cutting-in direction may agree with <111> direction of the crystal face (111), but, in this direction, hardness was extremely high and a precision for the point of a blade form of the tool was not obtained. Therefore, manufacturing was carried out again so that the cutting-in direction may agree with <110> direction of the crystal face (111). Crystal directions on respective points of blades of these three diamond tools are those considered to cause less abrasion. For the fourth diamond tool, manufacturing was carried out so that the cutting-in direction may agree with <100> direction of the crystal face (100) which is used generally. This is the crystal direction which tends to cause abrasion as is shown in FIG. 2. However, this is the direction used commonly because this direction makes it easy to manufacture the point of a blade to be highly accurate, and its yield in manufacturing is high.

For the cutting operations for the transfer optical surface, the rotating shaft (shaft B) was used to rotate the tool in accordance with a normal angle of the optical surface to be processed so that the cutting point may become one part of the cutting edge.

As a result, in the case of the diamond tool with <110> direction of the crystal face (100), it was possible to obtain an optical mirror surface on which the mean surface roughness Ra of the processed surface was 2.23 nm. On the point of a blade of the tool, no chipping was observed at all, and tool abrasion of about 20 µm in width was observed on a flank. In the case of the second diamond tool with <110> direction of the crystal face (110), no chipping was observed in the same way as in the first tool, and an optical mirror surface having the mean surface roughness Ra of 2.58 nm was obtained. However, tool abrasion of about 45 µm in width was observed on a flank. In the case of the third diamond tool with <110> direction of the crystal face (111), the surface was as slightly rough as 3.45 nm in mean surface roughness and it looked to be cloudy. Tool abrasion of about 5 μm in width was observed on a flank. In the case of the fourth diamond tool, the mean surface roughness Ra of the processed surface was 3.84 nm and the surface was rough although no cloudy surface was observed. On the point of a blade of the tool, no chipping was observed, and abrasion was 98 μm in width on a flank.

From the foregoing, it was found that, it is possible to restrain occurrence of chipping in the course of cutting operations in all crystal directions by making the face angle to be negative, and it is further possible to reduce tool abrasion and to keep the mirror surface of the transfer optical surface subjected to cutting operation to be high by selecting the crystal direction. In the present example, it was found that more effects for abrasion resistance can be obtained than in the case where the cutting-in direction is made to agree with the conventional <100> direction of the crystal face (100), if the cutting-in direction is made to agree with the crystal directions including <110> direction of the crystal face (100), <110> direction of the crystal face (110) and <110> direction of the crystal face (111).

Since the crystal of the diamond is of an octagonal system, the crystal orientation repeats every 90°. Therefore, the characteristic in a certain crystal direction appears in a range of plus or minus 30° for that direction, and it is preferable that the processing range used is within a range of plus or minus 15° if the characteristic in the crystal direction is required to appear more remarkably. Therefore, when the normal angle on the transfer optical surface to be processed exceeds 30°, it is necessary and Preferable, for utilizing the characteristic of the crystal direction on the point of a blade of diamond, that cutting operation is conducted while keeping so that crystal direction to be used may be within a range of plus or minus 15° for the cutting-in direction by shaft B as in the present example.

What is claimed is:

1. A machining method of machining a transfer optical surface on a optical element producing die having the transfer optical surface made of a material having Vickers hardness of Hv1500 or more, comprising:
   machining the transfer optical surface on the optical element producing die by cutting with a cutting tool,
   wherein a rake face of a tip of a blade of the cutting tool is set with an angle of minus values at an incising point on a surface to be machined.

2. The machining method of claim 1, wherein the angle of the rake face at the incision point is −60 degrees or more and −5 degrees or less.

3. The machining method of claim 2, wherein the angle of the rake face at the incision point is −45 degrees or more and −15 degrees or less.

4. The machining method of claim 1, wherein the cutting process is conducted with the cutting tool in which an angle between the rake surface and a flank face is set at 90° or more.

5. The machining method of claim 4, wherein the cutting process is conducted with the cutting tool in which the angle between the rake surface and the flank face is maintained at more than 90° without exceeding 145°.

6. The machining method of claim 5, wherein the cutting process is conducted with the cutting tool in which the angle between the rake surface and the flank face is maintained at 100° or more and 130° or less.

7. The machining method of claim 1, wherein the cutting process is conducted with the cutting tool in which an angle formed by the rake face and a direction of relative movement of the cutting tool with respect to the surface to be machined is maintained at less than 90°.

8. The machining method of claim 7, wherein the cutting process is conducted with the cutting tool in which an angle formed by the rake face and a direction of relative movement of the cutting tool with respect to the surface to be machined is maintained at 30° or more and 85° or less.

9. The machining method of claim 8, wherein the cutting process is conducted with the cutting tool in which an angle formed by the rake face and a direction of relative movement of the cutting tool with respect to the surface to be machined is maintained at 45° or more and 75° or less.

10. The machining method of claim 1, wherein a first tangent line of the rake face of the tool tip at an arbitrary point from the incising point of the rake face of the cutting tool to the cutting point is inclined in a direction of the relative movement between the cutting tool and material with respect to the incising direction, and a first angle formed by the first tangent line and the incising direction is smaller in a negative side than a second angle formed by a second tangent of the rake face of the tool tip at the incising point and the incising direction.

11. The machining method of claim 1, wherein the cutting process is conducted in such a way that a direction of the normal line at an arbitrary point in the machining area of the rake face of the cutting tool is kept in a direction being sandwiched by the incising direction and the moving direction of the cutting tool.

12. The machining method of claim 1, wherein the material of the transfer optical surface is a sintered alloy containing 500% or more by mass of cemented carbide or tungsten carbide (WC).

13. The machining method of claim 1, wherein the material of the transfer optical surface is CVD-SiC or sintered SiC.

14. The machining method of claim 1, wherein the blade tip is made of a mono-crystalline diamond.

15. The machining method of claim 14, wherein the crystal orientation <110> of the crystal surface (100) of the diamond is arranged within an angle range of plus or minus 15° with respect to the incising direction.

16. The machining method of claim 14, wherein the crystal orientation <110> of the crystal surface (111) of the diamond is arranged within an angle range of plus or minus 15° with respect to the incising direction.

17. The machining method of claim 14, wherein the crystal orientation <110> of the crystal surface (110) of the diamond is arranged within an angle range of plus or minus 15° with respect to the incising direction.

18. The machining method of claim 1, wherein the blade tip is made of CBN (Cubic Boron Nitride).

19. The machining method of claim 1, wherein the contour of the blade tip of the rake face is shaped in an arc form.

20. The machining method of claim 1, wherein the contour of the blade tip of the rake face is shaped in a pointed form.

21. The machining method of claim 1, wherein the contour of the blade tip of the rake face is shaped in a flat point form.

22. The machining method of claim 1, wherein the contour of the blade tip of the rake face is shaped in a semicircular form.

23. The machining method of claim 1, wherein the cutting process is conducted by a turning and cutting operation.

24. The machining method of claim 1, wherein the machining process for the transfer optical surface is conducted by using a machine having a rotary shaft.

25. The machining method of claim 1, wherein the cutting process is conducted by a fly cutting operation.

26. The machining method of claim 1, wherein the cutting process is conducted by a milling operation.

27. The machining method of claim 1, wherein the cutting process is conducted by a milling operation.

28. The machining method of claim 1, wherein the cutting process is conducted by a three or more-axis movable section.

29. The machining method of claim 1, wherein a contour shaped by the cutting process is a spherical or aspherical form.

30. The machining method of claim 1, wherein a contour shaped by the cutting process is a free form or a non-axisymmetric and aspherical form.

31. The machining method of claim 1, wherein the maximum normal line angle of the transfer optical surface produced by the cutting method is 30° or more.

32. The machining method of claim 1, wherein the cutting process is conducted at an incising depth of less than 0.5 μm per one cycle.

33. The machining method of claim 1, wherein the cutting process is conducted at a feed pitch of 20 μm or less.

34. The machining method of claim 1, further comprising:
    polishing the transfer optical surface after the cutting process.

35. The machining method of claim 1, further comprising:
    forming a layer on the transfer optical surface after the cutting process.

36. An optical element forming die, comprising:
    the transfer optical surface machined by the machining method described in claim 1 and having a surface roughness Ra of 15 nm or less.

37. An optical element, comprising:
    a optical surface transferred by using the optical element forming die described in claim 36.

* * * * *